US008952630B2

(12) United States Patent
Randazzo et al.

(10) Patent No.: US 8,952,630 B2
(45) Date of Patent: Feb. 10, 2015

(54) ELECTRONIC DEVICE AND METHOD FOR DRIVING THE LAMPS OF THE BLINKERS OF A VEHICLE

(71) Applicant: STMicroelectronics S.r.l., Agrate Brianza (MB) (IT)

(72) Inventors: Vincenzo Randazzo, Biancavilla (IT); Giovanni Luca Torrisi, Aci Catena (IT); Atanasio Labarbera, Aci Catena (IT)

(73) Assignee: STMicroelectronics S.r.l., Agrate Brianza (MB) (IT)

( * ) Notice: Subject to any disclaimer, the term of this patent is extended or adjusted under 35 U.S.C. 154(b) by 0 days.

(21) Appl. No.: 14/049,590

(22) Filed: Oct. 9, 2013

(65) Prior Publication Data

US 2014/0111086 A1 Apr. 24, 2014

(30) Foreign Application Priority Data

Oct. 19, 2012 (IT) .............................. MI2012A1772

(51) Int. Cl.
*H05B 37/02* (2006.01)
*B60Q 1/38* (2006.01)
*B60Q 1/34* (2006.01)

(52) U.S. Cl.
CPC ... *B60Q 1/38* (2013.01); *B60Q 1/34* (2013.01)
USPC ............................. 315/307; 315/291; 315/308

(58) Field of Classification Search
USPC ............. 315/209 R, 210, 224–226, 291, 307, 315/308, 312
See application file for complete search history.

(56) References Cited

U.S. PATENT DOCUMENTS

| 5,677,671 | A | 10/1997 | Pabla et al. |
| 6,087,931 | A | 7/2000 | Matsunaga |
| 2004/0155604 | A1 | 8/2004 | Kobayashi |
| 2009/0189548 | A1* | 7/2009 | Hoffman et al. ............... 315/307 |
| 2010/0090613 | A1* | 4/2010 | Spartano ....................... 315/287 |

FOREIGN PATENT DOCUMENTS

EP 2405278 B1 3/2013

* cited by examiner

*Primary Examiner* — Jimmy Vu
(74) *Attorney, Agent, or Firm* — Allen, Dyer, Doppelt, Milbrath & Gilchrist, P.A.

(57) ABSTRACT

An electronic system for driving a lamp of a blinker of a vehicle may include a switch having a first input terminal configured to receive a battery voltage, a second input control terminal configured to receive a control signal for operating the switch, and an output terminal. The system may also include a change-over switch configured to connect, alternatively, the output terminal of the switch to the lamp and to a high impedance reference. The system may also include an electronic device connected to the switch and configured to detect a voltage drop between the first input terminal and the output terminal, and, based upon the voltage drop, generate the control signal to have a value to maintain the switch open for a time interval, and generate the control signal to have a second value to maintain the switch closed for another time interval.

14 Claims, 13 Drawing Sheets

ELECTRONIC DEVICE AND METHOD FOR DRIVING THE LAMPS OF THE BLINKERS OF A VEHICLE

FIELD OF THE INVENTION

The present invention relates to the field of electronics. More particularly, the present invention relates to blinker lamps on a vehicle.

BACKGROUND OF THE INVENTION

The turn on of the blinker lamps on inexpensive vehicles (particularly on small engine motor vehicles) is controlled by an electronic device implemented with a dedicated integrated circuit. In this way, the use of a micro-controller, which is excessively expensive, may be avoided.

Referring to FIG. 1, an electronic system 1 controlling the turn on and off of the lamps of the blinkers 5, 6 of a vehicle is illustrated. The electronic system 1 includes an electronic device 2, a supply capacitor C1, a switch 3 (implemented, for example, with MOSFET type transistor), a mechanical change-over switch 4, and two lamps 5, 6 included in the left and right blinkers respectively. The switch 3 is interposed between a battery voltage $V_{batt}$ and the mechanical change-over switch 4, and the supply capacitor C1 is connected between the electronic device 2 and the mechanical change-over switch 4. Each lamp 5, 6 has a terminal connected to a ground reference and another terminal connected to the change-over switch 4.

The mechanical change-over switch 4 has the function of connecting, alternatively, the switch 3 to the lamp of the left blinker 5, to the lamp of the right blinker 6, or to a high impedance reference indicated in the following with $Z_\infty$, as a function of the blinker's driving command generated by the vehicle driver. The term "high impedance reference $Z_\infty$" may be understood as an impedance value greater than 30 kΩ. For example, the mechanical change-over switch 4 is positioned adjacent the driving wheel of a motor vehicle or on the handlebars of a motorcycle, and it is controlled by the driver of the motor vehicle or motorcycle by a three-positions lever in the case of a motor vehicle or by a three-positions button in the case of a motorcycle.

The electronic device 2 generates a control signal $S1_{ctrl}$ having a periodic trend (for example, a square wave having high and low logical values) to drive the control terminal $t1_{ctrl}$ of the switch 3 and to intermittently turn on lamp 5 (or 6) of a blinker when the latter is actuated, so that the vehicle driver can signal the change of direction. The control signal $S1_{ctrl}$ has, for example, a frequency equal to 1.42 Hz, which corresponds to a period of 704 ms. Typically, the length of the high edge in a period of the control signal $S1_{ctrl}$ is equal to the one of the low edge, that is, it is equal to 352 ms (which is commonly known as "duty-cycle" equal to 50%).

In particular, the operation of the electronic system 1 may be described by the following:

the driver actuates the left blinker, and the mechanical change-over switch 4 performs the connection of the output terminal $t1_{out}$ of the switch 3 to the lamp 5: the electronic device 2 generates the control signal $S1_{ctrl}$ having a periodic trend which periodically closes the switch 3 and thus the lamp 5 is intermittently turned on;

the driver actuates the right blinker, and the mechanical change-over switch 4 performs the connection of the output terminal $t1_{out}$ of the switch 3 to the lamp 6: the electronic device 2 generates the control signal $S1_{ctrl}$ having the periodic trend which periodically closes the switch 3 and thus the lamp 6 is intermittently turned on;

the driver deactivates a blinker, and the mechanical change-over switch 4 performs the connection of the output terminal $t1_{out}$ of the switch 3 to the high impedance reference $Z_\infty$: the lamp 5 (or 6) is turned off, while the electronic device 2 continues to generate the control signal $S1_{ctrl}$ having the periodic trend for a short time interval (1 second, for example) for discharging the supply capacitor C1, and thereafter takes null values.

It may be possible to observe that the electronic device 2 does not have a direct connection to a ground reference voltage. In fact, the electronic device 1 is connected to a ground reference voltage only when the driver has actuated a blinker (that is, the lamp 5 or 6 is connected to the switch 3), and only at instants when the corresponding lamp 5 or 6 is turned off, because this is substantially equivalent to a short circuit (for example, it has a resistance value less than 1 Ohm, typically on the order of 100 milli-Ohms).

Instead, the electronic device 2 loses the electrical connection to the ground reference voltage at instants when the corresponding lamp 5 or 6 is turned on, because this has a resistance value of a few Ohms to a few tenths of Ohms (20Ω, for example). Therefore, it may be desirable necessary to use the supply capacitor C1 to allow the electronic device 2 to correctly generate the control signal $S1_{ctrl}$ when a lamp 5 or 6 is connected. The supply capacitor C1 is charged when the control signal $S1_{ctrl}$ has a low logic value (and thus the lamp 5 or 6 is connected, but it is turned off), while the supply capacitor C1 is discharged (because it supplies the electronic device 2) when the control signal $S1_{ctrl}$ has a high logic value (and thus the lamp 5 or 6 is connected and it is turned on).

It is observed that the electronic device 2 continues to generate the control signal $S1_{ctrl}$ with a periodic trend for a short time interval also after the blinker has been deactivated (that is, when it is no more desirable for the vehicle driver to signal the change of direction). Because the supply signal is present, the supply capacitor C1 continues to supply the electronic device 2 for a determined time interval as the supply capacitor C1 is discharged. When the supply capacitor C1 is discharged (typically, after 1 second), the control signal $S1_{ctrl}$ takes null values.

It may be particularly desirable to control the value of the delay between the instant when the vehicle driver activates a blinker to turn on the corresponding lamp signaling the change of direction, and the instant when the first pulse of the control signal $S1_{ctrl}$ is generated (i.e., the instant between the activation of the blinker and the first transition from the low to the high logic value of the control signal $S1_{ctrl}$). This delay (in the following referred as "delay of the first pulse") generally has to be sufficiently short because it corresponds to the delay at which the first turn on of the lamp occurs. The first turn on of the lamp should be timely because it indicates to the drivers of surrounding vehicles that the vehicle is changing direction. For example, the value of the delay of the first pulse should be less than 100 ms (See, for example, the Japanese standard JIS D).

It may also be particularly desirable to control the value of the length of the high edge of the first pulse (referred in the following as "length of the first pulse"). The value of this length should be sufficiently high to enable the human eye of the driver of an adjacent vehicle to perceive that a blinker has been activated. For example, the length of the first pulse should be greater than or equal to 200 ms (See again, for example, the standard JIS D).

The Applicant has observed that the electronic system 1 of the known approach can fail to fulfill the requirements of the maximum delay of the first pulse and/or of the minimum length of the first pulse in the case the vehicle driver activates a blinker, deactivates the blinker, and activates again a blinker (the same or another) in a time interval less than the time for discharging the supply capacitor C1. In fact, as previously indicated, the electronic device 2 continues to generate the control signal $S1_{ctrl}$ with a periodic trend for a certain time interval also when the blinker of the lamp 5 or 6 has been deactivated (that is, when it is no more desirable for the vehicle driver to signal the direction change), and because the supply signal is present, the supply capacitor C1 continues supplying the electronic device 2 for a time interval wherein the supply capacitor C1 is discharged. If a blinker (the same or another) is again activated before the supply capacitor C1 is discharged, the instant when the blinker is activated is asynchronous with respect to the control signal $S1_{ctrl}$, which has again periodical oscillations. This may cause the requirements of the maximum delay of the first pulse and/or of the minimum length of the first pulse to fail to be fulfilled.

For example, it is assumed that the control signal $S1_{ctrl}$ is periodic with a period equal to 704 ms and a duty cycle of the 50%, that is, the high length of the pulses is equal to 352 ms. Under this assumption, the blinker may be activated when the pulse of the control signal $S1_{ctrl}$ (still present by way of the supply capacitor C1) has maintained the high logic value for 200 ms. In this case, the first pulse of the control signal $S1_{ctrl}$ continues to have the high logic value for a further 152 ms (because the total length of a pulse is equal to 352 ms) and thus the requirement that the length of the first pulse must be greater than or equal to 200 ms is not fulfilled.

Another example is one wherein the blinker is activated when the pulse of the control signal $S1_{ctrl}$ (still present by way of the supply capacitor C1) has just terminated to maintain the high logic value and has performed a transition to the low logic value. In this case, the control signal $S1_{ctrl}$ maintains the low logic value for about 352 ms, and after about 352 ms does it transition to the high logic value, thus failing to fulfill the requirement of the delay of the first pulse which must be less than 100 ms.

Therefore, it may be desirable to control the maximum value of the delay of the first pulse and the minimum value of the length of the first pulse so that it fulfills the requirements set by various standards, for example, without a direct connection of the electronic device 2 to a ground reference voltage.

SUMMARY OF THE INVENTION

An electronic system for driving a lamp of a blinker of a vehicle, the lamp having a terminal electrically connected to a ground reference voltage, may include a switch having a first input terminal configured to receive a battery voltage, a second input control terminal configured to receive a control signal for opening and closing the switch, and an output terminal. The electronic device may also include a changeover switch configured to connect, alternatively, the output terminal to the lamp and to a high impedance reference, and an electronic device coupled to the switch. The electronic device may be configured to detect whether a voltage drop between the first input terminal and the output terminal is less than a first voltage value, and, based thereon, generate the control signal to have a first value to maintain the switch open. The electronic device is also configured to detect whether the voltage drop between the first input terminal and the output terminal is greater than or equal to the first voltage value, and, based thereon, generate the control signal to have the first value to maintain the switch open for a time interval less than a maximum time interval, and generate the control signal to have a second value to maintain the switch closed for a time interval greater than or equal to a minimum time interval. Accordingly, the electronic system may allow the requirements of the maximum delay of the first pulse and of the minimum length of the first pulse to be fulfilled without a direct connection of the electronic device to a ground reference voltage, for example.

The electronic device may be configured to detect whether a current flowing through the switch is less than a current value and to generate the control signal to have the first value for opening the switch. The electronic device may include comprises a low voltage detecting circuit that may include a first input terminal coupled to the first input terminal of the switch and configured to receive the battery voltage and a second input terminal coupled to the output terminal of the switch and configured to receive receiving a monitoring voltage signal. The low voltage detecting circuit may also include a voltage divider coupled between the first input terminal and the second input terminal and configured to generate a divided voltage signal based upon the battery voltage and the monitoring voltage signal and a first voltage comparator configured to receive the divided voltage signal and a divided voltage value, and based thereon, generate a low voltage signal having a value indicating a disconnection of the lamp when the lamp is turned off, the divided voltage value being a partition of the first voltage value. The electronic device may be configured to detect the low voltage signal and generate, based thereon, the control signal having the first value for maintaining the switch open.

The electronic device may include a low current detecting circuit that may include a first input terminal coupled to the first input terminal of the switch and configured to receive the battery voltage, and a second input terminal coupled to the output terminal of the switch and configured to receive the monitoring voltage signal. The low current detecting circuit may include a third input terminal coupled to the second input control terminal of the switch and configured to receive the control signal and a n-channel MOSFET transistor having a gate terminal coupled to the third input terminal and configured to receive control signal, having a drain terminal coupled to the first input terminal and configured to receive the battery voltage, and having a source terminal configured to provide an internal monitoring voltage signal.

The low current detecting circuit may also include a monitoring resistor having a first terminal coupled to the source terminal of the n-channel MOSFET transistor and configured to receive the internal monitoring voltage signal, and having a second terminal coupled to the second input terminal and configured to receive the monitoring voltage signal. A second voltage comparator may be configured to receive the internal monitoring voltage signal and a second voltage value, and generate a low current signal having a value indicating a disconnection of the lamp when the lamp is turned on, the second voltage value being based upon a current value of current flowing through the switch. The electronic device may be configured to detect the low current signal and generate, based thereon, the control signal having the first value for opening the switch.

The electronic device may also include a counter configured to count to a value equal to half of a period, wherein the electronic device is configured to reset the value of the counter when a low voltage value having the value indicating the disconnection of the lamp when the lamp is turned off and when the low current signal has the value indicating the disconnection of the lamp when this is turned on. The electronic system may further include a supply capacitor between the electronic device and the output terminal of the switch, and configured to supply the lamp when the lamp is connected and turned on. The electronic system may also include a charging circuit configured to be supplied by the battery voltage and to charge the supply capacitor when the lamp is connected and turned off.

An integrated circuit aspect includes the switch and the electronic device of the electronic system described above. A method aspect is directed to a method of driving a lamp of a blinker of a vehicle.

The method may include disconnecting, using a switch, the lamp and detecting whether a voltage drop between a first input terminal and an output terminal of the switch is less than a first voltage value and opening the switch. The method may also include reconnecting, using the switch, at least one of the lamp and another lamp and detecting whether the voltage drop between the first input terminal and the output terminal of the switch is greater than or equal to the first voltage value. The method may further include maintaining the switch open for a time interval less than a maximum time interval, and maintaining the switch closed for a time interval greater than or equal to a minimum time interval.

Detecting whether the voltage drop between the first input terminal and the output terminal of the switch is less than the first voltage value and opening the switch may include detecting whether current flowing through the switch is less than a current value and opening the switch. The method may further include, between reconnecting the at least one of the lamp and another lamp and detecting whether the voltage drop between the first input terminal and the output terminal of the switch is greater than or equal to the first voltage value, detecting whether the voltage drop between the first input terminal and the output terminal of the switch is less than the first voltage value, resetting a value of a first counter, and incrementing the value of the first counter toward a first counting value.

Also between reconnecting the at least one of the lamp and another lamp and detecting whether the voltage drop between the first input terminal and the output terminal of the switch is greater than or equal to the first voltage value, the method may include resetting a value of a second counter and incrementing the value of the second counter to reach a second counting value less than the value of the first counting value, and detecting whether the voltage drop between the first input terminal and the output terminal is less than the first voltage value and resetting the value of the first counter. The method may further include, between reconnecting the at least one of the lamp and another lamp and detecting whether the voltage drop between the first input terminal and the output terminal of the switch is greater than or equal to the first voltage value, resetting the value of the second counter and incrementing the value of the second counter until the second counting value is reached and detecting whether the voltage drop between the first input terminal and the output terminal is greater than or equal to the first voltage value, resetting the value of the second counter and incrementing the value of the second counter. The method may still further include, between reconnecting the at least one of the lamp and another lamp and detecting whether the voltage drop between the first input terminal and the output terminal of the switch is greater than or equal to the first voltage value, incrementing the value of the first counter until the first counting value is reached and closing the switch.

DETAILED DESCRIPTION OF THE PREFERRED EMBODIMENTS

Figure 1:
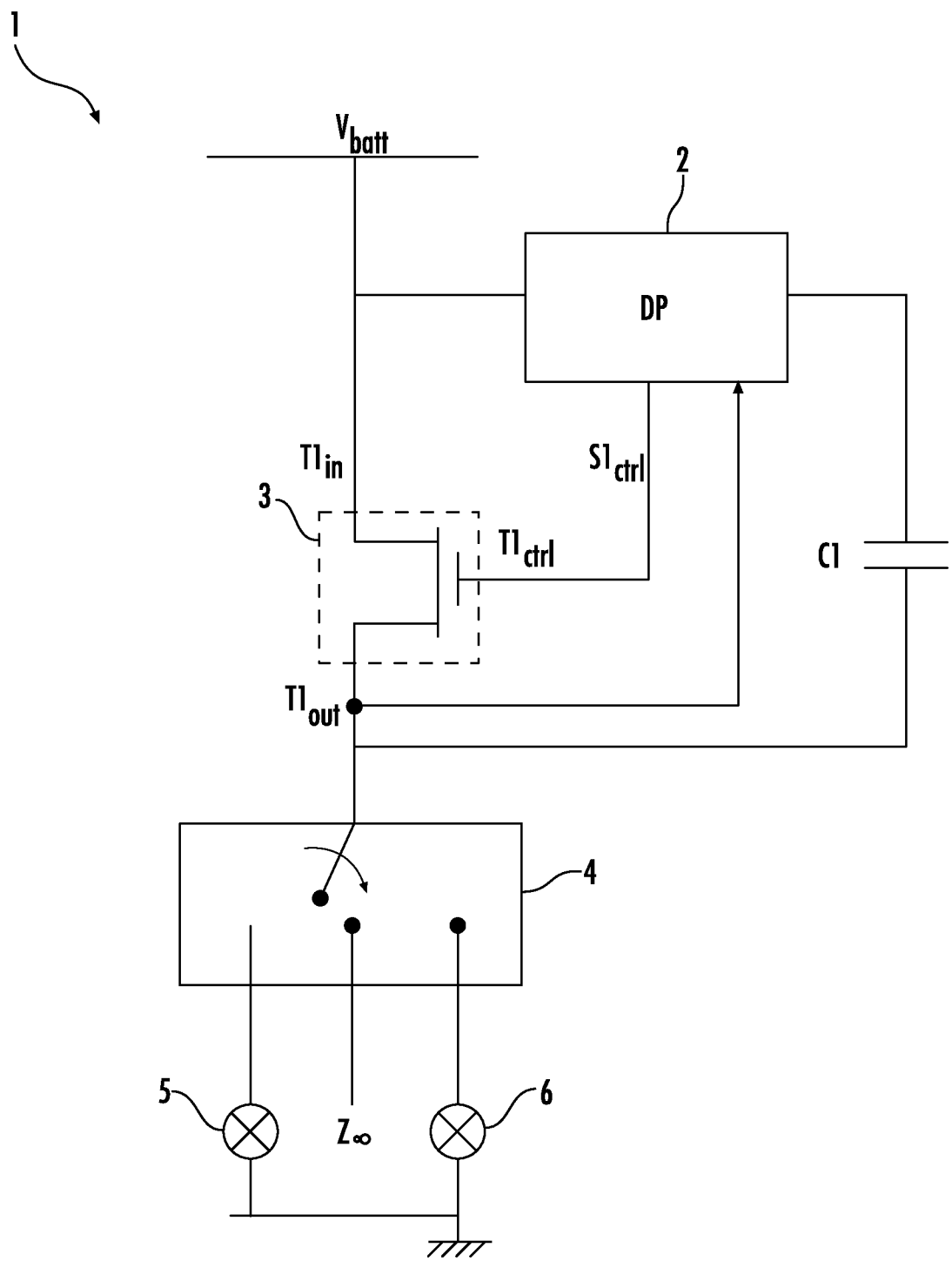
FIG. 1 is a schematic diagram of an electronic system to control the lamps of the blinkers of a vehicle according to the prior art.
Figure 2:
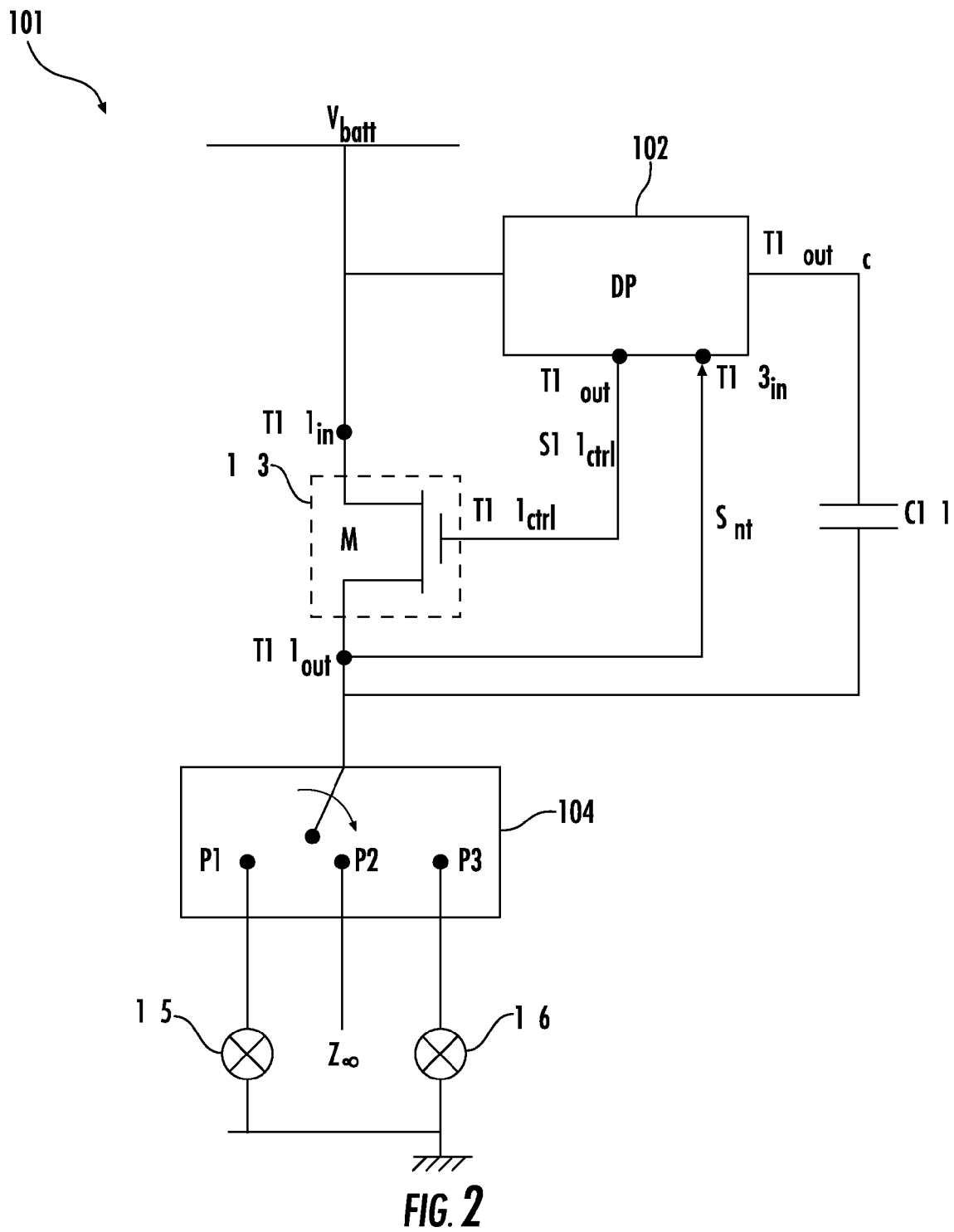
FIG. 2 is a schematic diagram of an electronic system for controlling the lamps of the blinkers of a vehicle according to an embodiment of the present invention.

With reference to FIG. 2, an electronic system 101 for controlling the turn on and the turn off of the lamps 5, 6 of the blinkers on a vehicle (a motorcycle or a motor vehicle, for example) according to an embodiment is illustrated. The electronic system 101 is thus mounted on a vehicle.

The electronic system 101 includes an electronic device 102, a supply capacitor C101, a switch 103, a mechanical change-over switch 104 controlled by the vehicle driver, and two lamps 105, 106 included in the left and right blinkers respectively. The switch 103 is implemented, for example, with an n-channel MOSFET type transistor M0 and is interposed between a battery voltage $V_{batt}$ and the mechanical change-over switch 104. In particular, the switch 103 includes a first input terminal $t101_{in}$ to receive the battery voltage $V_{batt}$, an output terminal $t101_{out}$ to provide a monitoring voltage signal $S_{mnt}$, and a second input control terminal $t101_{ctrl}$ to receive a control signal $S101_{ctrl}$ for opening or closing the switch 103.

The electronic device 102 includes a first input terminal to receive the battery voltage $V_{batt}$, a second input terminal $t103_{in}$ to receive the monitoring voltage signal $S_{mnt}$, and a first output terminal $t102_{out}$ connected to the second input control terminal $t101_{ctrl}$ of the switch 103 and to supply the control signal $S101_{ctrl}$ for opening or closing the switch 103. The electronic device 102 also includes a second output terminal $t104_{out}$ connected to a first terminal of the supply capacitor C101 and to generate a charging current $I_{chg}$.

The electronic device 102 is supplied by a supply voltage $V_{dd}$ less than the battery voltage $V_{batt}$. For example, the value of the battery voltage $V_{batt}$ may be equal to 12 V, and the value of the supply voltage $V_{dd}$ may be equal to 3.3 V.

The electronic device 102 may generate, at its first output terminal $t102_{out}$ (and thus, at the second input control terminal $t101_{ctrl}$ of the switch 3) the control signal $S101_{ctrl}$ having a periodic trend (for example, a square wave having high and low logic values) to drive the periodic closure and opening of the switch 103. Thus, the lamp 105 (or 106) of a blinker is intermittently turned on when the latter is activated so that the driver signals the change of direction of the vehicle.

The control signal $S101_{ctrl}$ is periodic, for example, with a frequency equal to 1.42 Hz, which corresponds to a period of 704 ms. Typically, the length of the high edge in a period of the control signal $S101_{ctrl}$ is equal to the one of the low edge, that is, it is equal to 352 ms (that is a "duty-cycle" equal to 50%).

Moreover, the electronic device 102 generates the control signal $S101_{ctrl}$ to have suitable values at instants between the deactivation of a blinker and the next activation of a blinker (the same or another one) to fulfill the requirements of the maximum delay of the first pulse and of the minimum length of the first pulse, as it will be explained in further detail below. Moreover, the electronic device 102 generates, at its second output terminal $t104_{out}$, a charging current $I_{chg}$ for charging the supply capacitor C101 at instants when the lamp 105 or 106 is connected and it is turned off.

The mechanical change-over switch 104 includes an input terminal connected to the output terminal $t101_{out}$ of the switch 103 to receive the monitoring voltage signal $S_{mnt}$ and includes three output terminals connected to the lamp 105 of left blinker, to the high impedance reference $Z_\infty$ (an open circuit, for example), and to the lamp 106 of right blinker, respectively. The mechanical change-over switch 104 has three possible positions p1, p2, p3 which respectively have the function of connecting, alternatively, its input terminal (and thus the output terminal $t101_{out}$ of the switch 103) to the lamp 105 of the left blinker, to the high impedance reference $Z_\infty$, and to the lamp 106 of the right blinker, as a function of the blinkers driving command generated by the vehicle driver (not shown in FIG. 2). For example, the mechanical change-over switch 104 is positioned adjacent the steering wheel of a motor vehicle or on the handlebars of a motorcycle and is controlled by the motor vehicle or motorcycle driver, by, a three-positions lever in the case of a motor vehicle or by a three-positions button in the case of a motorcycle, wherein the three-positions of the lever or of the button correspond to the three positions p1, p2, p3.

The supply capacitor C101 has a first terminal connected to the second output terminal $t104_{out}$ of the electronic device 102 and a second terminal connected to the output terminal $t101_{out}$ of the switch 103 (and thus connected to the input terminal of the mechanical change-over switch 104). The supply capacitor C101 supplies the electronic device 102 at instants wherein lamp 105 or 106 is connected (positions p1 and p3 of the mechanical change-over switch 104, respectively) and lamp 105 or 106 is turned on, as will be explained in the description with respect to the operation of the electronic system 101. In particular, the supply capacitor C101 is charged when the control signal $S101_{ctrl}$ has a low logic value (and thus the lamp 105 or 106 is connected, but it is turned off), while the supply capacitor C101 is discharged (because it supplies the electronic device 102) when the control signal $S101_{ctrl}$ has a high logic value (and thus the lamp 105 or 106 is connected and it is turned on).

Each lamp 105, 106 has a terminal connected to a ground reference and another terminal connected to a respective output terminal of the change-over switch 104. The ground reference coincides with the negative terminal of the battery and can be, for example, the frame of the vehicle on which the electronic system 101 is installed. When the lamps 105, 106 are connected and turned off, they are substantially equivalent to a short circuit (for example, it has a resistance value less than 1 Ohm, typically on the order of 100 milli-Ohms) and thus the output terminal $t101_{out}$ of the switch 103 is connected to the ground reference voltage. When the lamps 105, 106 are connected and turned on, they have a resistance value from a few Ohms to a few tenths of Ohms (20Ω, for example).

In particular, when the vehicle driver activates the left blinker, the mechanical change-over switch 104 takes position p1 wherein electrical connection is made of its input terminal to its output terminal connected to lamp 105 (See FIGS. 4A, 4C), and thus the connection of the output terminal $t101_{out}$ of the switch 103 to the lamp 105, is performed. The electronic device 102 generates the control signal $S101_{ctrl}$ having a periodic trend which periodically closes the switch 3 so that the lamp 105 intermittently turns on. The first pulse of the control signal $S101_{ctrl}$ fulfills the requirements of the maximum delay of the first pulse and of the minimum length of the first pulse, as will be explained in further detail below.

When the driver of the vehicle activates the right blinker, the mechanical change-over switch 104 takes position p3, wherein an electrical connection is made of its input terminal to its output terminal connected to the lamp 106, and thus the connection of the output terminal $t101_{out}$ of the switch 103 to the lamp 106 is performed. The electronic device 102 generates the control signal $S101_{ctrl}$ having a periodic trend which periodically turns on the switch 3 so that the lamp 106 is intermittently turned on. The first pulse of the control signal $S101_{ctrl}$ fulfills the requirements of the maximum delay of the first pulse and of the minimum length of the first pulse, as will be explained in further detail below.

When the vehicle driver deactivates a blinker, the mechanical change-over switch 104 takes position p2 wherein an electrical connection is made of its input terminal to its output terminal connected to the high impedance reference $Z_\infty$ (see FIGS. 4B, 4D), and thus the connection of the output terminal $t101_{out}$ of the switch 103 to the high impedance reference $Z_\infty$ is performed. The lamp 105 (or 106) is turned off (or it remains turned off) and the electronic device 102 generates the control signal $S101_{ctrl}$ having a suitable value such to open (or maintain open) the switch 103 (for example, a low logic value L), as will be explained in further detail below regarding the operation of the electronic system 101.

The electronic device 102 does not have a direct connection to the ground reference voltage. In fact, the electronic device 102 is connected to a ground reference voltage only when the driver activates a blinker (that is the lamp 105 or 106 is connected to the switch 103) and only at instants wherein the corresponding lamp 105 or 106 is turned off because this is substantially equivalent to a short circuit. The electronic device 102, instead, loses the electrical connection to the ground reference voltage at instants wherein the corresponding lamp 105 or 106 is turned on because this has a resistance value from a few Ohms to a few tenths of Ohms (20Ω, for example). Therefore the voltage values of the signals of the electronic device 102 and of the switch 103 are indicated in the following as "relative" voltage values if referred to a virtual ground which is formed by the voltage $V(t101_{101})$ at the output terminal $t101_{out}$ of the switch 103.

Figure 3:
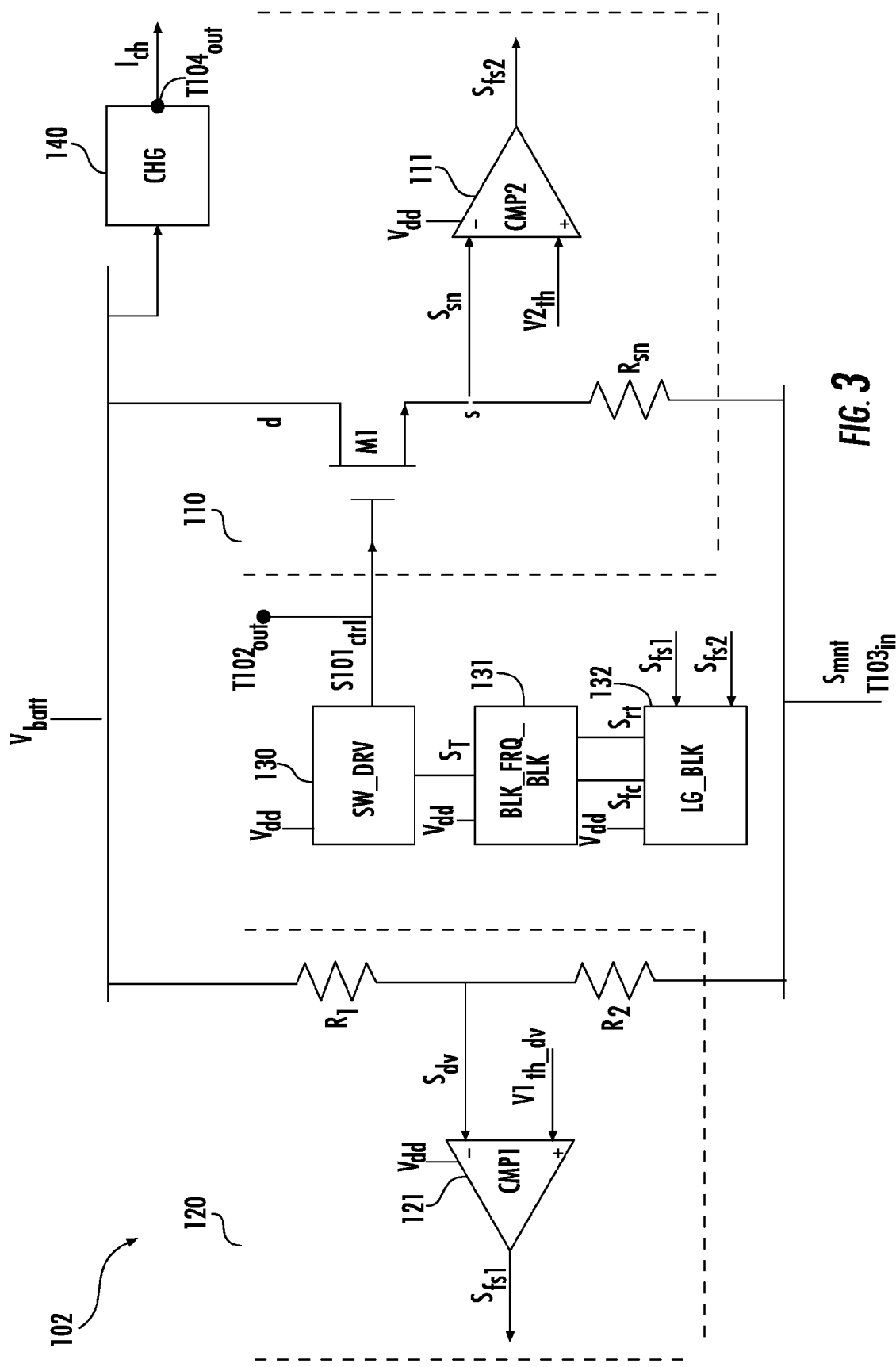
FIG. 3 is a more detailed schematic diagram of an electronic device of the electronic system of FIG. 2.

Referring to FIG. 3, further details of the electronic device 102 generating the control signal $S101_{ctrl}$ for controlling the opening or closure of the switch 103 are illustrated. In particular, the electronic device 102 includes a charging circuit 140, a low voltage detecting circuit 120, and a low current detecting circuit 110. The electronic device 102 also includes a logic circuit 132, a generating circuit 131 of a periodic signal, and a driving circuit 130 having an input terminal for receiving an internal control signal $S_T$ and having an output terminal for providing the control signal $S101_{ctrl}$ as a function of the values of the internal control signal $S_T$.

The low voltage detecting circuit 120, the low current detecting circuit 110, the logic circuit 132, the generating circuit 131, and the driving circuit 130 are supplied by a low supply voltage $V_{dd}$, for example, equal to 3.3 V. More generally, the electronic device 102 may include further electronic components, such as, for example voltage regulators, oscillators, logic circuits, analog-to-digital converters, and protection circuits. The components are not shown in FIG. 3 for sake of simplicity.

The charging circuit 140 is supplied by the battery voltage $V_{batt}$, and it generates the charging current $I_{chg}$ for charging the supply capacitor C101 at instants when the lamp 105 or 106 is connected and it is turned off. The low voltage detecting circuit 120 detects that the voltage drop $V_{sw}$ across the switch 103 (that, is $V_{sw}=V_{batt}-V(t101_{out})=V_{batt}-S_{mnt}$) is less than a first threshold voltage $V1_{th}$. This indicates, in case the value of the control signal $S101_{ctrl}$ has a value such to maintain open the switch 103, that there is a transition from the state wherein the output terminal $t101_{out}$ of the switch 103 is electrically connected to a turned off lamp 105 (or 106) to the state wherein the output of the switch 103 is connected to a high impedance reference $Z_\infty$. In other words, this indicates (See instant $t_5$ in FIG. 6A) that the driver of the vehicle has driven the change-over switch 104 to turn off the lamp 105 (or 106) of a blinker at the instant wherein the lamp 105 (or 106) was turned off. This allows the electronic device 102 to be placed in a stand-by state and to store the stand-by state, as will be better in further detail below with respect to the operation associated with FIG. 6A. Subsequently, (See the instant $t_6$ in FIG. 6A) when the driver of the vehicle drives the change-over switch 104 to activate again a blinker and thus to connect the corresponding lamp 105 (or 106) in a time interval less than the time for discharging the supply capacitor C101 (for example, less than 1 s), the electronic device 102 is able to generate the first pulse of the control signal $S101_{ctrl}$ with suitable values fulfill the requirements of the maximum delay of the first pulse and of the minimum length of the first pulse (See the description of the operation at instants $t_6, t_7, t_8$ in FIG. 6A).

For example, if it is assumed that the value of the battery voltage $V_{batt}$ is equal to 12 V, the voltage value relating to the first voltage threshold $V1_{th}$ (that is, the voltage value referred to the virtual ground formed by the output terminal $t101_{out}$) is equal to 9 V. In particular, the low voltage detecting circuit 120 includes a first input terminal connected to the first input terminal $t101_{in}$ of the switch 103 and to receive the battery voltage $V_{batt}$, a second input terminal connected to the second input terminal $t103_{in}$ of electronic device 102 (and thus connected to the output terminal $t101_{out}$ of the switch 103) and to receive the monitoring voltage signal $S_{mnt}$, and a voltage divider interposed between the first input terminal and the second input terminal, including, for example, two resistors $R_1, R_2$, to generate a divided voltage signal $S_{dv}=V_{sw}*R_2/(R_1+R_2)$. The low voltage detecting circuit also includes a first voltage comparator 121 to receive the divided voltage signal $S_{dv}$ at the negative terminal and the value of a first divided voltage threshold $V1_{th\_dv}$ at the positive terminal and such to generate a low voltage signal $S_{fs1}$ having a high logic value H when the divided voltage signal $V_{dv}$ value is less than the first divided voltage threshold $V1_{th\_dv}$. This indicates that the disconnection of a lamp 105 (or 106) has occurred at an instant when this was turned off.

The voltage divider generates the divided voltage signal $S_{vd}$ having voltage values less than the values of the voltage drop $V_{sw}$ across the switch 103. In this way it may be possible to supply the voltage comparator 121 with a supply voltage (3.3 V, for example) less than the battery voltage $V_{batt}$, and it is possible to perform the comparison between the voltage values (that is $S_{dv}, V1_{th\_dv}$ at the input of the first voltage comparator 121) which are smaller, thus improving the accuracy of the comparison.

In particular, the value of the first divided voltage threshold $V1_{th\_dv}$ is less than the value of the first threshold voltage $V1_{th}$ and it is calculated therefrom by the voltage divider. For example, if it is assumed that the battery (relative) voltage value $V_{batt}$ is equal to 12 V and it is desirable that the (relative) voltage value of the first threshold voltage $V1_{th}$ is equal to 9 V, the voltage divider is designed so that the (relative) voltage value of the first divided voltage threshold $V1_{th\_dv}$ is equal to 1.2 V. In the particular case where the voltage divider is implemented with resistors $R_1$ and $R_2$, since $S_{dv}=V_{sw}*R_2/(R_1+R_2)$, by setting $S_{dv}=1.2$ V and $V_{sw}=9$ V, the following relation between the resistances of the resistors $R_1$ and $R_2$ is obtained: $1.2*(R_1+R_2)=9*R_2$. For sake of simplicity it is observed that only one resistor $R_1$ has been considered, but more in generally it is possible to use a plurality of resistors in series in place of the resistor $R_1$.

The low current detecting circuit 110 detects that the current flowing through the switch 103 is less than a threshold current $I_{th}$. This indicates, in case the value of the control signal $S101_{ctrl}$ has a value to maintain turned on the switch 103, that a transition from the state occurred wherein the output terminal $t101_{out}$ of the switch 103 is electrically connected to a turned on lamp 105 (or 106) to the state wherein the output of the switch 103 is connected to the high impedance reference $Z_\infty$. That is, it indicates (See the instant $t_{106}$ in FIG. 7A) that the driver of the vehicle has driven the change-over switch 104 to disconnect the lamp (105 or 106) of a blinker at the instant when the lamp 105 (or 106) was turned on. This allows the electronic device 102 to be placed in the stand-by state and to store the stand-by state, as it will be explained in further detail below in the description of the operation relating to FIG. 7A. Subsequently, (See instant $t_{107}$ of FIG. 7A) when the driver of the vehicle drives the change-over switch 104 to again activate a blinker and thus to connect the corresponding lamp 105 (or 106) in a time interval less than the time for discharging the supply capacitor C101 (for example, less than 1 s), the electronic device 102 is able to generate the first pulse of the control signal $S101_{ctrl}$ having suitable values to fulfill the requirements of the maximum delay of first pulse and of the minimum length of the first pulse (See the description regarding operation at instants $t_{107}, t_{108}, t_{109}$ of FIG. 7A).

For example, if it is assumed that the value of the battery voltage $V_{batt}$ is equal to 12 V, and that the switch 103 is such to carry a current equal to about 1.2 A when it is connected to a turned on lamp (105 or 106), the current threshold value $I_{th}$ is equal to 200 mA. In particular, the low current detecting circuit 110 includes a first input terminal connected to the first input terminal $t101_{in}$ of the switch 103 to receive the battery voltage $V_{batt}$, a second input terminal connected to the second input terminal $t103_{in}$ of electronic device 102 (and thus connected to the output terminal $t101_{out}$ of the switch 103) and to receive the monitoring voltage signal $S_{mnt}$, and a third input terminal connected to the first output terminal $t102_{out}$ of the electronic device 102 (and thus connected to the second input control terminal $t101_{ctrl}$ of the switch 103) and connected to the output terminal of the driving circuit 103, and to receive the control signal $S101_{ctrl}$.

The low current detecting circuit 110 also includes a n-channel MOSFET transistor M1 having a gate terminal connected to the third input terminal and to receive the control signal $S101_{ctrl}$, having the drain terminal d connected to the first input terminal and to receive the battery voltage $V_{batt}$, and having the source terminal to provide an internal monitoring voltage signal $S_{sn}$. A monitoring resistor $R_{sn}$ has a first terminal connected to the source terminal of the MOSFET transistor M1 and to receive the internal monitoring voltage signal $S_{sn}$, having a second terminal connected to the second input terminal and such to receive the monitoring voltage signal $S_{mnt}$. A second voltage comparator 111 receives the internal monitoring voltage signal $S_{sn}$ and the value of a second threshold voltage $V2_{th}$ and generates a low current signal $S_{fs2}$ having a high logic value H when the value of the internal monitoring voltage signal $S_{sn}$ is less than the second threshold voltage $V2_{th}$. This indicates that a disconnection of a lamp 105 (or 106) occurred at an instant when it was turned on.

The monitoring resistor $R_{sn}$ converts the current flowing through MOSFET transistor M1 into the internal monitoring voltage signal $S_{sn}$ to perform a comparison among voltage values (by way of the second voltage comparator 111) instead of a comparison between current values. Moreover, the set of the MOSFET transistor M0 and of the MOSFET transistor M1 form a current mirror, wherein the current flowing through the MOSFET transistor M1 is proportional to the current flowing through the MOSFET transistor M0. In particular, the current flowing through the MOSFET transistor M0 is mirrored by a factor 1/K over the MOSFET transistor M1.

The value of the second threshold voltage $V2_{th}$ depends on the value of the threshold current $I_{th}$. For example, if the value of the threshold current $I_{th}$ is equal to 200 mA, the voltage value relating to the second voltage threshold $V_{th}$ (that is the value of the voltage referred to the virtual ground formed by the output terminal $t101_{out}$) is equal to 50 mV. Consequently, a low logic value of the low current signal $S_{fs2}$ indicates that the current $I_{LD}$ flowing through the input terminal of the mechanical change-over switch 104 is greater than the value of the threshold current $I_{th}$, while a high logic value of the low current signal $S_{fs2}$ indicates that the current $I_{LD}$ flowing through the input terminal of the mechanical change-over switch 104 is less than the value of the threshold current $I_{th}$.

The logic circuit 132 generates signals which are used for the timings of the electronic system 101. In particular, the logic circuit 132 includes an internal counter CNT to count until a counting value is equal to T/2, wherein T is the period of the control signal $S101_{ctrl}$ when a blinker is activated. The logic circuit 132 generates an end counting signal $S_{fc}$ having a first logic value (for example, a high one) for indicating that the internal counter CNT has reached the value T/2 and having a second logic value (a low one, for example) for indicating that the internal counter CNT has not reached the value T/2.

Moreover, the logic circuit 132 includes a counter $cnt_1$ to count until a counting value is equal to $T_{A1}$. The logic circuit 132 generates a delay signal $S_{rt}$ having a first logic value (a high one, for example) for indicating that the counter $cnt_1$ has reached its counting value $T_{A1}$ and having a second logic value (a low one, for example) for indicating that the counter $cnt_1$ has not yet reached its counting value $T_{A1}$. The counting value $T_{A1}$ is chosen so that it is less than the maximum delay $T_{max}$ of the first pulse. This allows the requirement of the maximum delay of the first pulse to be fulfilled, as will be explained in further detail below. For example, if the maximum value of the delay of the first pulse $T_{max}$=100 ms, it is chosen $T_{A1}$=50 ms.

The generating circuit 131 receives the end counting signal $S_{fc}$ and the delay signal $S_{rt}$, and generates the periodic internal control signal $S_T$ when a blinker has been activated, and thus the corresponding lamp 105 (or 106) is connected as a function of the values of the end counting signal $S_{fc}$, of the delay signal $S_{rt}$, and of the previous value of the internal control signal $S_T$.

When the blinker of a lamp 105 or 106 has been activated, the internal control signal $S_T$ is periodic, for example, it is a square wave having a period T equal to 704 ms (and thus a frequency equal to 1.42 Hz) and a duty-cycle of 50% and having values between 0 V and a high voltage value (3.3 V, for example).

The driving circuit 130 receives, at its input terminal, the internal control signal $S_T$ and, as a function thereof, generates, at its output terminal, the control signal $S101_{ctrl}$ having a low or high logic value for opening or closing the switch 103. The low or high logic value has voltage values that are compatible with the voltage values of second input control terminal $t101_{ctrl}$ of the switch 103.

Figure 6A:
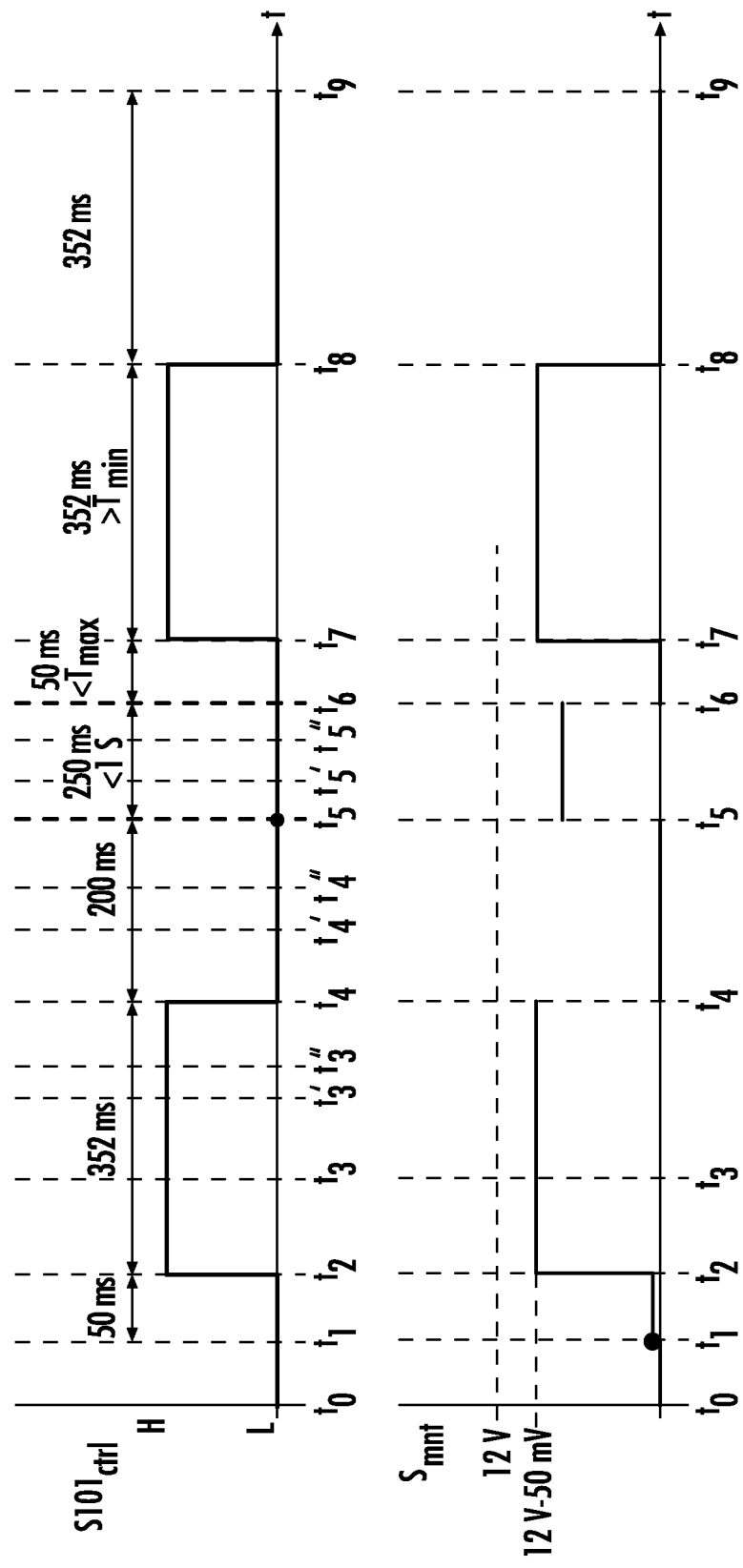
FIGS. 6A-6B are graphs showing possible trends of signals generated in the electronic system according to an embodiment of the present invention.
Figure 6B:
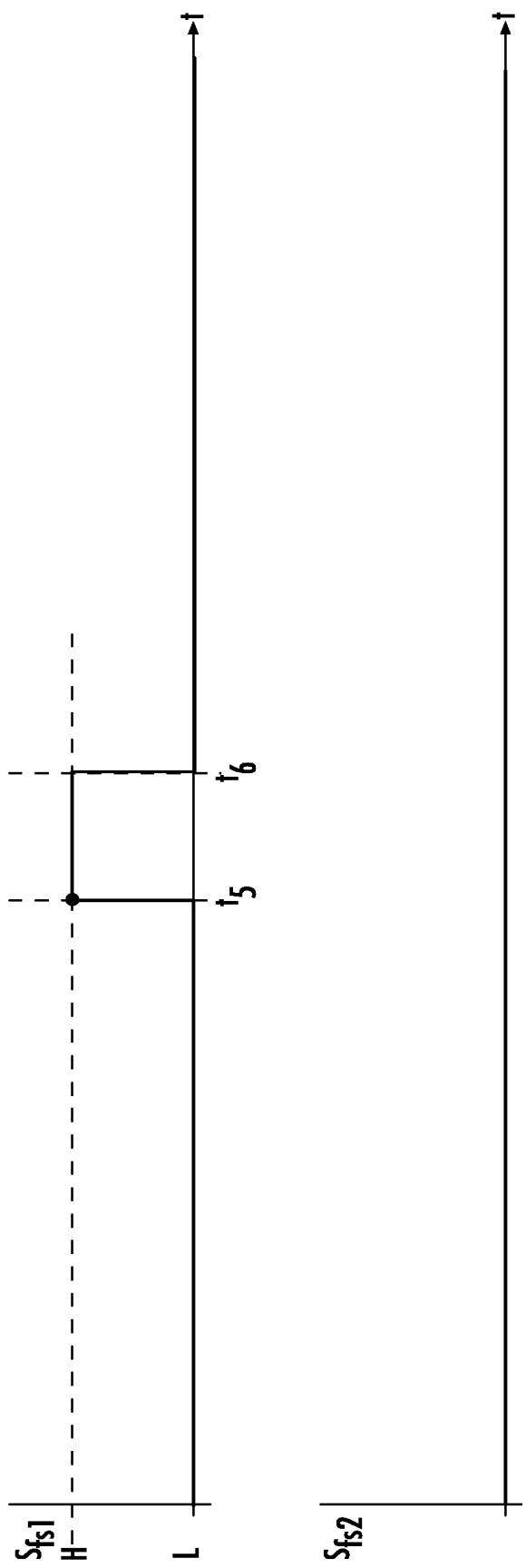

FIGS. 6A-6B illustrate a first possible trend of the control signal $S101_{ctrl}$, of the monitoring signal $S_{mnt}$, of the low voltage signal $S_{fs1}$, and of the low current signal $S_{fs2}$. Illustratively, the control signal $S101_{ctrl}$ has a square-wave periodic trend when the lamp 105 (or 106) of a blinker is connected (instants between $t_1$ and $t_5$, $t_5$ excluded, and instants between $t_7$ and $t_9$), while it has a null value at instants when the lamp is disconnected (instants between $t_5$ and $t_6$, $t_6$ excluded). Moreover, the requirements of the maximum delay of first pulse and of the minimum length of the first pulse are illustratively fulfilled (instants between $t_6$ and $t_8$).

Figure 7A:
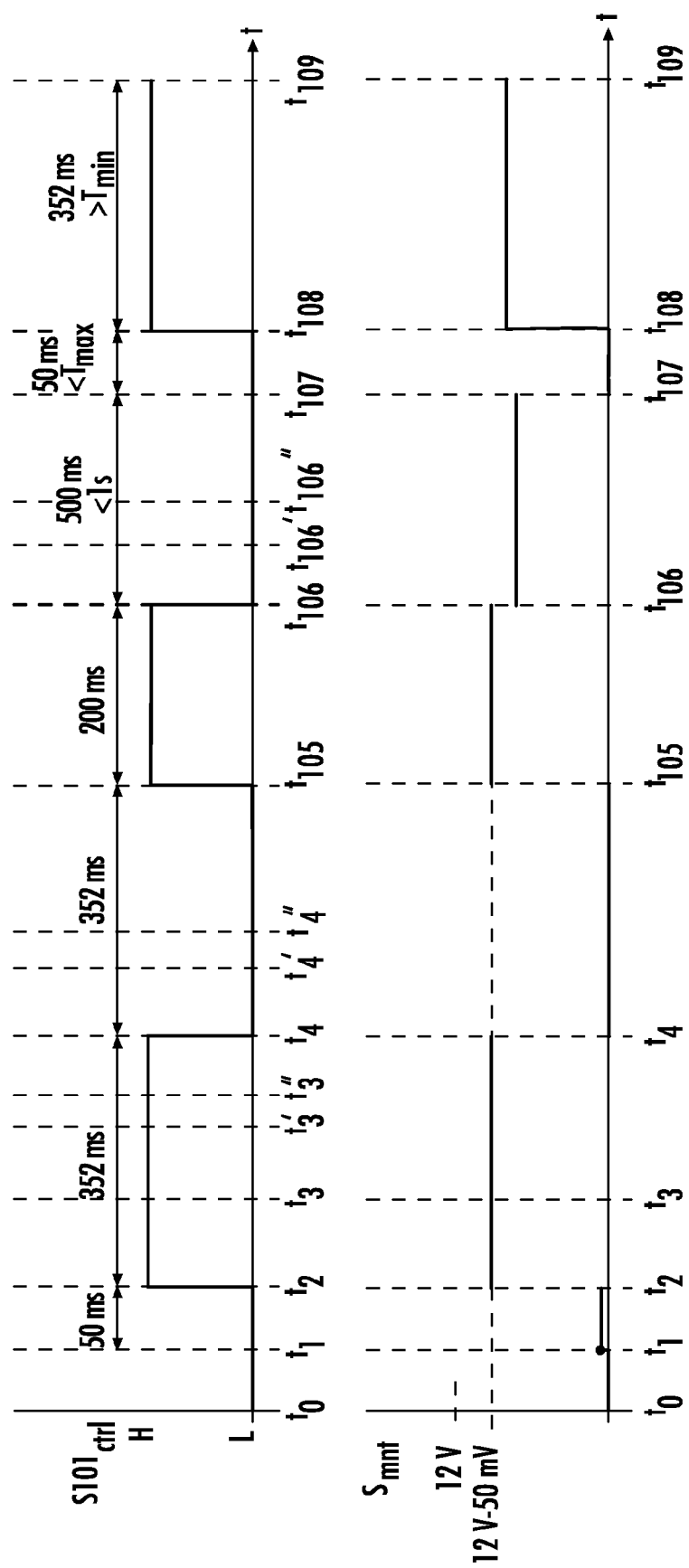
FIGS. 7A-7B are showing further possible trends of signals generated in the electronic system according to an embodiment of the present invention.
Figure 7B:
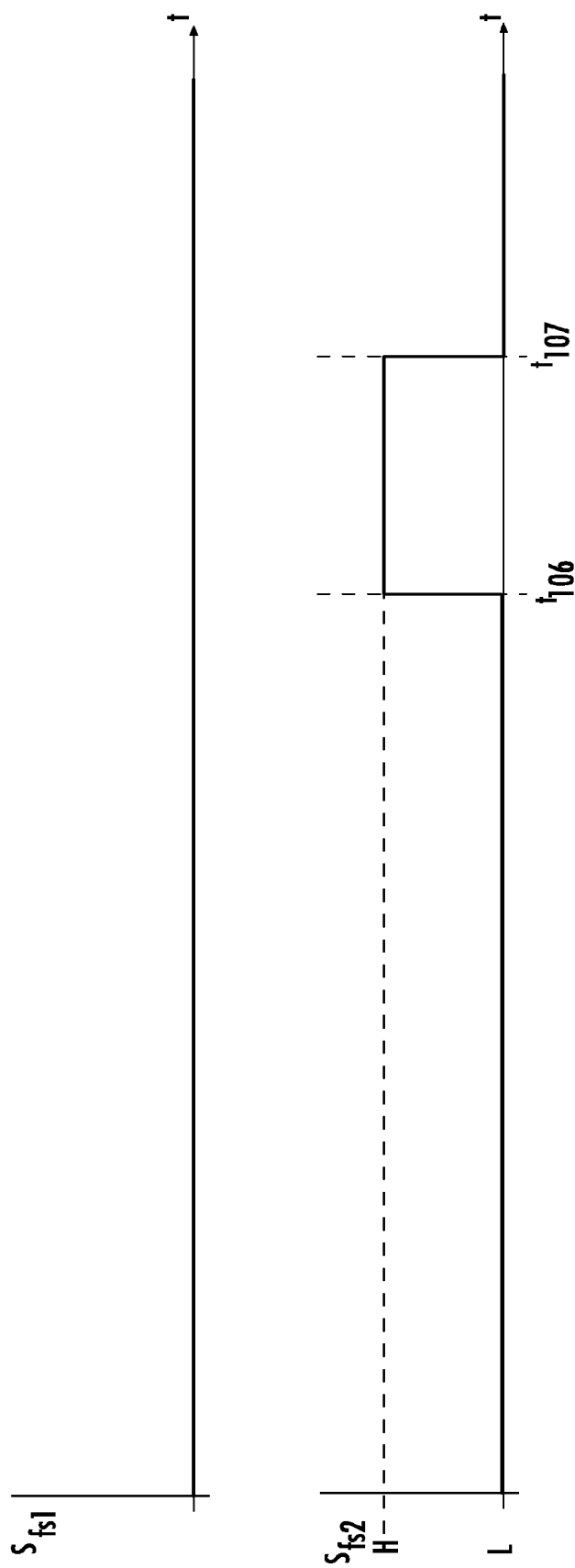

FIGS. 7A-7B illustrate a second possible trend of the control signal $S101_{ctrl}$, of the monitoring signal $S_{mnt}$, of the low voltage signal $S_{fs1}$, and of the low current signal $S_{fs2}$. Illustratively, the control signal $S101_{ctrl}$ has a square-wave periodic trend when the lamp 105 (or 106) of a blinker is connected (instants between $t_1$ and $t_6$, $t_6$ excluded, and instants between $t_8$ and $t_9$), while it has a null value at instants when the lamp is disconnected (instants between $t_6$ and $t_7$, $t_7$ excluded). Moreover, illustratively, the requirements of the maximum delay of the first pulse and of the minimum length of the first pulse are fulfilled (instants between $t_7$ and $t_9$).

Figure 5A:
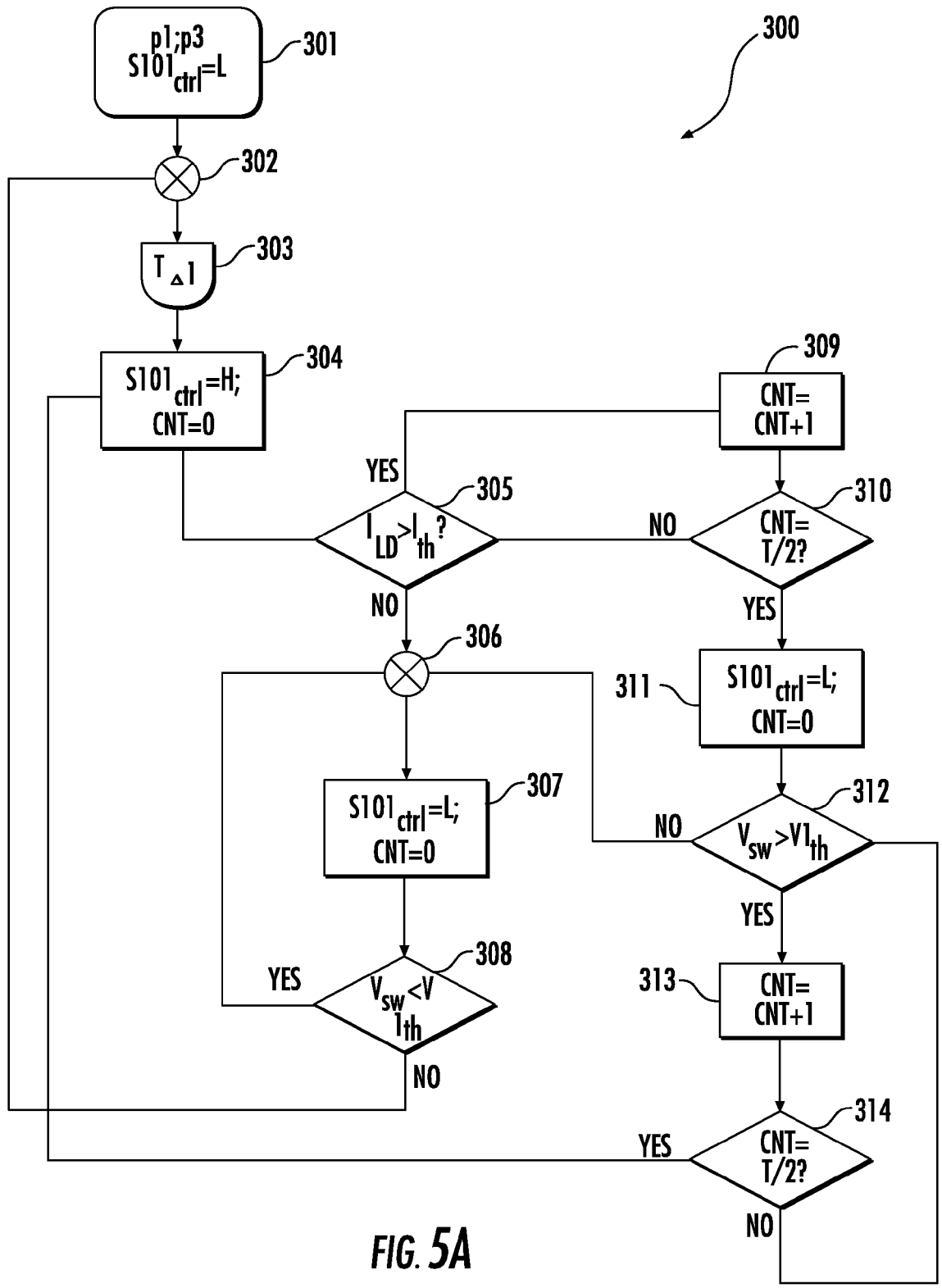
FIGS. 5A-5B are flow diagrams illustrating a method of controlling the lamps of the blinkers of a vehicle according to an embodiment of the present invention.

With reference to FIG. 5A, the flow diagram of a method 300 for controlling the turning on and off of the lamps 105, 106 of the blinkers on a vehicle according to an embodiment to fulfill the requirements of the maximum delay of the first pulse and of the minimum length of the first pulse of the control signal $S101_{ctrl}$ is illustrated. In step 301, the mechanical change-over switch 104 takes position p1, wherein it connects its input terminal to its output terminal connected to lamp 105 (and thus connects the output terminal $t101_{out}$ of the switch 103 to the lamp 105). Alternatively, the mechanical change-over switch 104 takes position p3, wherein it connects its input terminal to its output terminal connected to the lamp 106 (and thus it connects the output terminal $t101_{out}$ of the switch 103 to lamp 106). It is assumed in the following that the mechanical change-over 104 takes the position p1. It is observed that step 301 is performed when the mechanical change-over switch 104 takes, for the first time, the position p1 or p3 after the first activation of a blinker (for example, the first activation after the ignition of a vehicle equipped with the electronic system 101) and when the mechanical change-over switch 104 takes the position p1 (or p3) following the activation of a blinker after a time interval (with respect to the previous deactivation of a blinker) less than the time for discharging the supply capacitor C101.

Figure 4A:
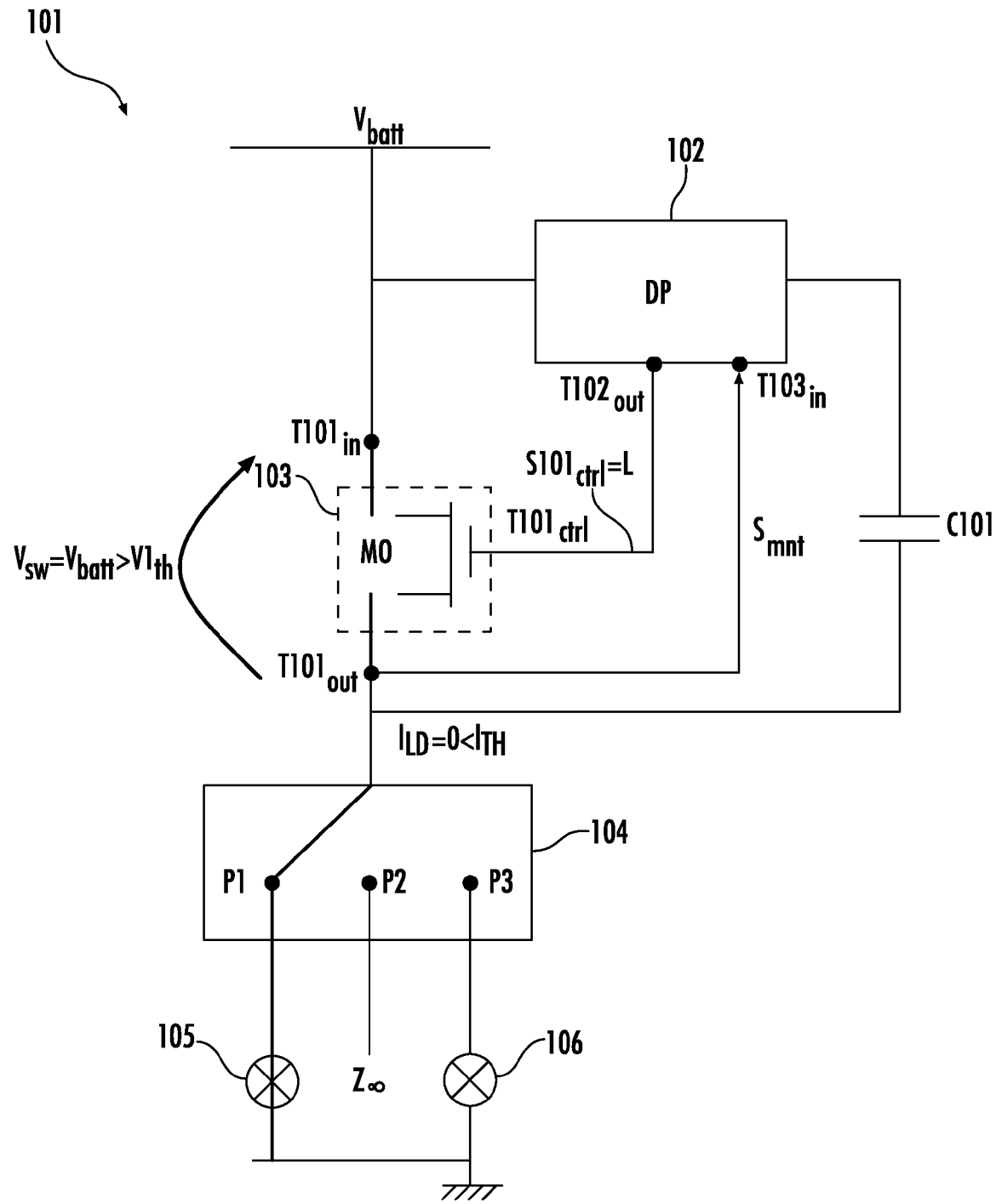
FIGS. 4A-4D are schematic diagrams showing different states of the control electronic system according to an embodiment of the present invention.

Moreover, in step 301, the control signal $S101_{ctrl}$ is generated having a low logic value L, maintaining the switch 103 open (see FIG. 4A). From step 301 it continues to step 302 and to step 303 wherein the counter $cnt_1$ (inside the logic circuit 132) starts counting from the value zero and counts for a time interval equal to $T_{A1}$, thus reaching a counting value equal to $T_{A1}$. Therefore it remains in step 303 for a time interval equal to $T_{A1}$, which is chosen to be less than the maximum delay $T_{max}$ of the first pulse. This allows the requirement of the maximum delay $T_{max}$ of the first pulse to be fulfilled. For example, if the value of the maximum delay of the first pulse $T_{max}$=100 ms, it is chosen $T_{A1}$=50 ms.

Figure 4B:
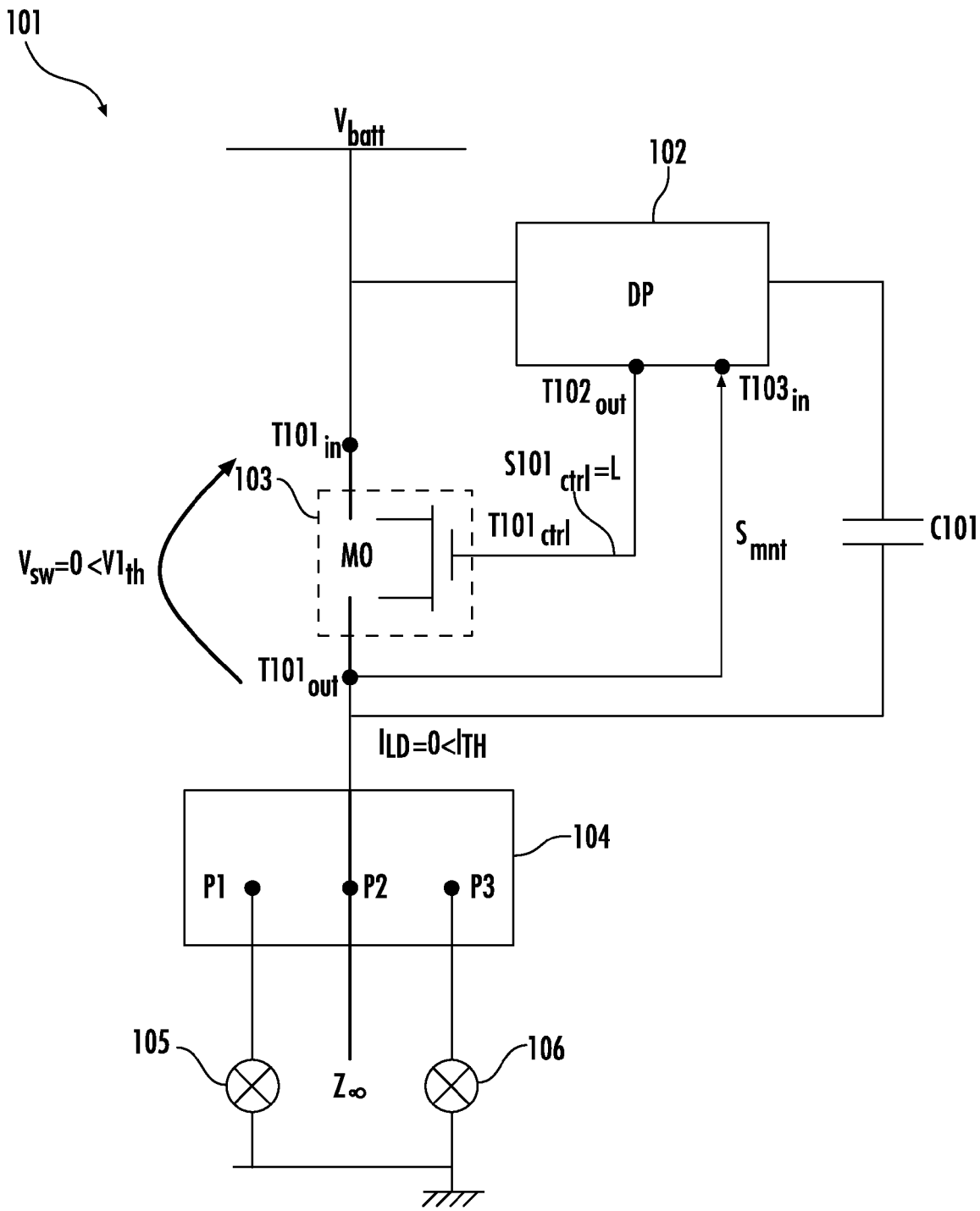
Figure 4C:
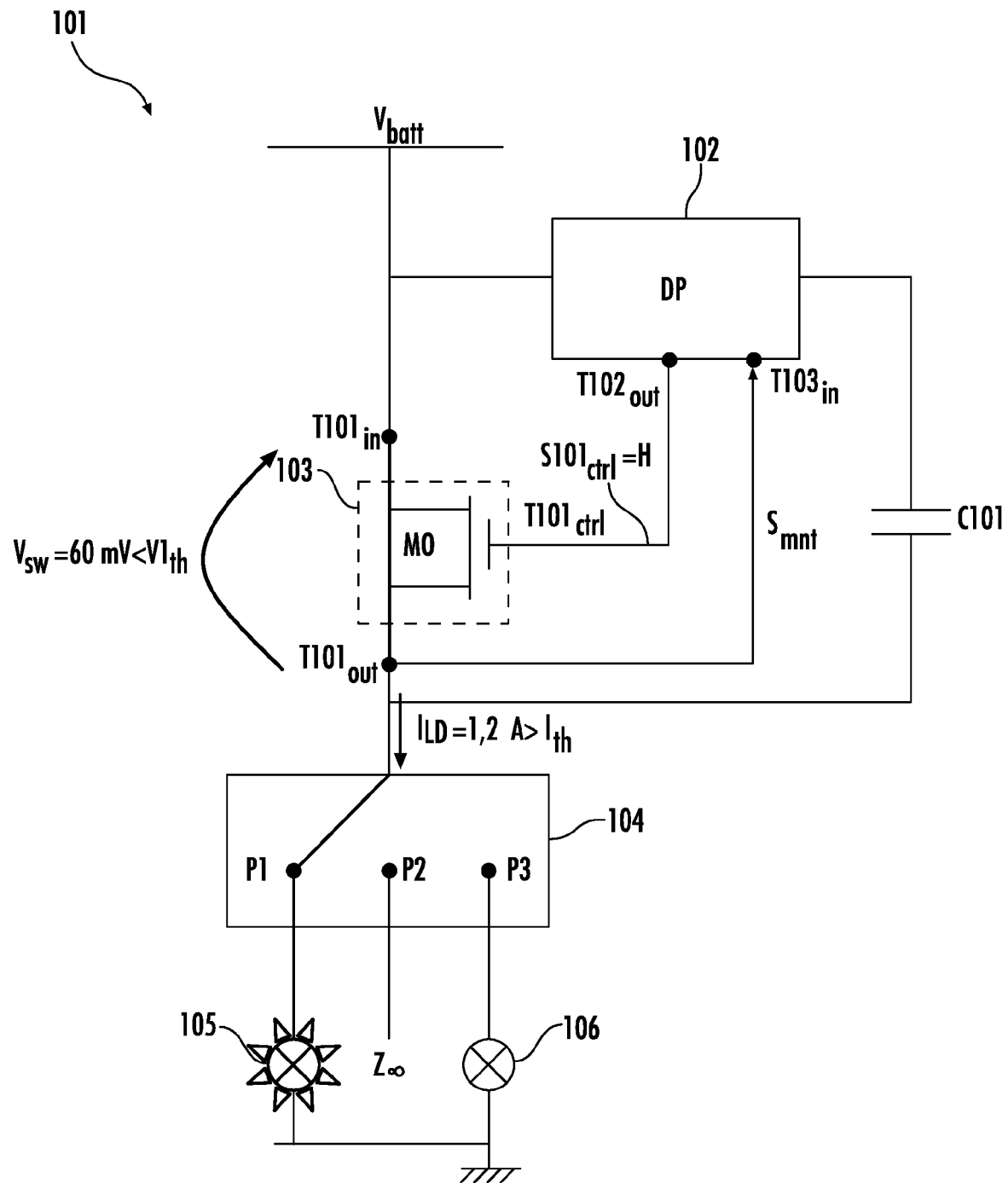

From step 303 it continues to step 304 wherein it the control signal $S101_{ctrl}$ is generated having a low logic value H, which turns off the switch 103 (See FIG. 4C). Moreover, the value of the internal counter CNT in electronic device 102 is reset (in particular, inside the logic circuit 132).

From step 304 it continues to step 305, wherein it is verified if the current $I_{LD}$ flowing through input terminal of the mechanical change-over switch 104 is greater than the value of threshold current $I_{th}$. In an affirmative case (that is, $I_{LD}>I_{th}$, see FIG. 4C), it continues with step 309, while in a negative case (that is, $I_{LD}<I_{th}$, see FIG. 4D) it continues with steps 306, 307.

Figure 4D:
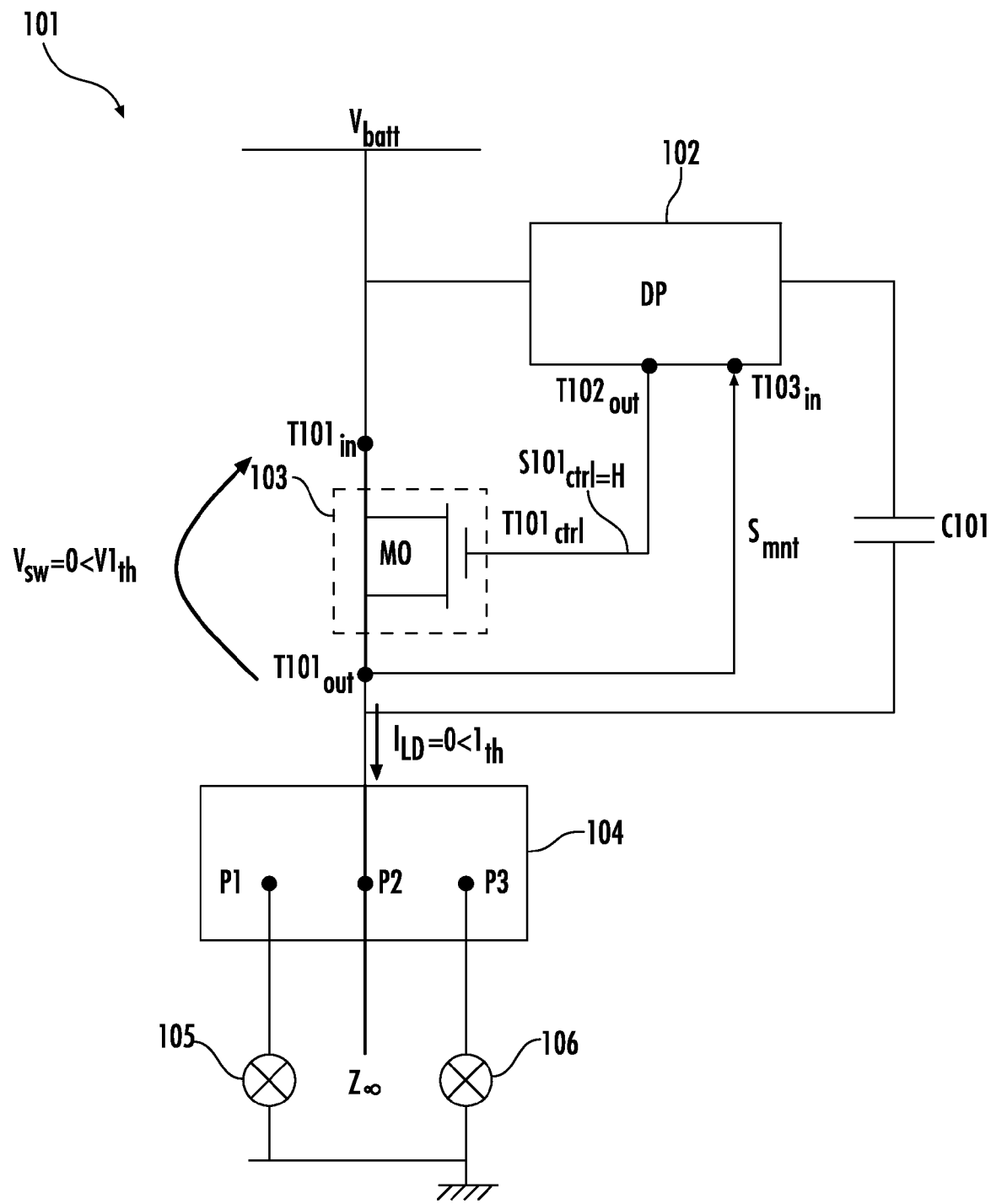

It is observed that the transition from step 305 to steps 306, 307 (the case wherein $I_{LD}<I_{th}$) corresponds to the transition of the electronic system 101 from the state shown in FIG. 4C to the one shown in FIG. 4D, that is, it corresponds to the situation wherein the driver of the vehicle drives the change-over switch 104 to disconnect the lamp 105 at an instant when this was turned on. Therefore the condition $I_{LD}<I_{th}$ of step 305 allows detection of a turned on lamp of a blinker has been disconnected and allows placement of the electronic device 102 in a stand-by state.

In step 307 the control signal $S101_{ctrl}$ is generated having a low logic value L for opening (or maintaining open) the switch 103 and placing the electronic device 102 in the stand-by state. Moreover, the value of the internal counter CNT is set equal to 0.

From step 307 it continues to step 308 wherein it is verified if the value of the voltage drop $V_{sw}$ across the change-over switch 104 is less than the first threshold voltage $V1_{th}$. In the affirmative case (that is, $V_{sw}<V1_{th}$), it continues to steps 306 and 307, while in a negative case (that is, $V_{sw}>V1_{th}$), it continues to steps 302 and 303.

It is observed that the transition from step 308 to steps 306, 307 (the case wherein $V_{sw}<V1_{th}$) corresponds to the transition of the electronic system 101 from the state shown in FIG. 4A to the one shown in FIG. 4B, that is, it corresponds to the case wherein the driver of the vehicle drives the change-over switch 104 to disconnect the lamp 105 at an instant wherein it was turned off. Therefore the condition $V_{sw}<V1_{th}$ of the step 308 allows detection of a turned off lamp of a blinker that has been disconnected and it allows the electronic device 102 to be maintained in the stand-by state.

The loop formed by steps 306, 307, 308 is repeated until the condition $V_{sw}<V1_{th}$ is verified, that is, until the driver maintains the change-over switch 104 in the position p2 wherein the lamps 105, 106 are disconnected (See instants $t_5$', $t_5$" of FIG. 6A).

In step 309, the value of the internal counter CNT is increased. From step 309 it continues to step 310 wherein it is verified if the value of the internal counter CNT has reached the value of half of the period (that is, equal to T/2), for example equal to 704/2 ms=352 ms. In a negative case (that is, CNT<T/2) it returns to step 305, while in an affirmative case (that is CNT=T/2) it continues with step 311.

The loop defined by steps 305, 309, 310 is repeated until the condition $I_{LD}>I_{th}$ is verified, that is, until the driver maintains the change-over switch 104 in the position p1 (or p3) wherein the lamp 105 (or 106) is connected and is turned on (see $t_3$, $t_3$', $t_3$" in FIG. 6A).

In step 311, the control signal $S101_{ctrl}$ is generated having a low logic value L, which opens the switch 103. Moreover, the value of the internal counter CNT is set to 0.

From step 311 it continues to step 312 wherein it is verified if the value of the voltage drop $V_{sw}$ across the change-over switch 104 is greater than the first threshold voltage $V1_{th}$. In an affirmative case (that is, $V_{sw}>V1_{th}$) it continues to step 313, while in a negative case (that is, $V_{sw}<V1_{th}$) it continues to steps 306 and 307.

In step 313, the value of the internal counter CNT is increased. From step 313 it continues to step 314 wherein it is verified if the value of the internal counter CNT has reached a value equal to half the period (that is CNT=T/2). In the negative case (that is, CNT different from T/2) it returns to step 312, while in the positive case (that is, CNT=T/2) it returns to step 304.

The loop defined by steps 312, 313, 314 is repeated until the condition $V_{sw}>V1_{th}$ is verified, that is, until the driver maintains the change-over switch 104 in position p2, wherein the lamps 105, 106 are disconnected (See $t_{106}$', $t_{106}$" of FIG. 7A).

Figure 5B:
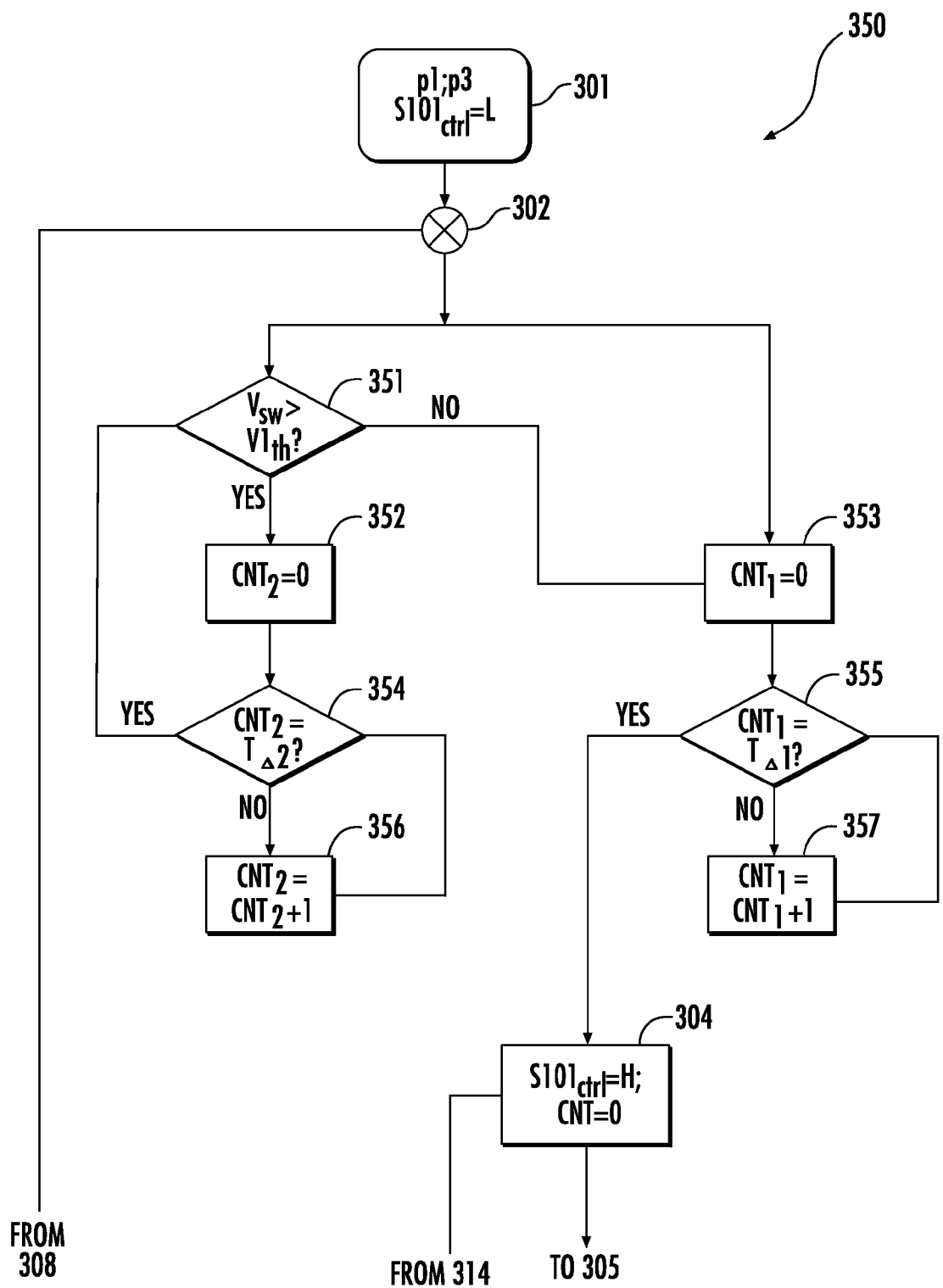

With reference to FIG. 5B, a flow diagram of a variant of the method 350 for controlling the turn on and turn off of lamps 105, 106 of the blinkers on a vehicle according to the embodiment of the invention to fulfill the requirements of the maximum delay of the first pulse and of the minimum length of the first pulse of the control signal $S101_{ctrl}$ is illustrated. The method 350 allows detection of a decrease of the nominal value of the battery voltage $V_{batt}$ when a lamp (105 or 106) is connected, and the electronic system 101 generates the control signal $S101_{ctrl}$ having a periodic trend for intermittently turning on the lamp (105 or 106). More in particular, the electronic system 101 is in a state wherein the lamp 105 is connected and is turned off (See FIG. 4A), and the voltage drop $V_{sw}$ across the switch 103 is less than the first threshold voltage $V1_{th}$ due to a decrease of the nominal value of the battery voltage $V_{batt}$, in turn, caused by a temporary failure of the battery. For example, the nominal value of the battery voltage $V_{batt}$ is equal to 12 V, and the temporary value of the battery voltage $V_{batt}$ decreases to 5 V.

The method 350 differs from the method 300 for the presence of a further counter $cnt_2$ for reaching a counting value less than the counting value reached by counter $cnt_1$. For example, the counter $cnt_1$ counts to 50 ms and the counter $cnt_2$ counts to 20 ms. The counter $cnt_2$ maintains the electronic system 101 (which is in the state shown in FIG. 4A wherein the lamp 105 is connected and it is turned off) in the stand-by state (maintaining the low logic value of the control signal $S101_{ctrl}$) until the value of the battery voltage $V_{batt}$ is less than the first threshold voltage $V1_{th}$ due to a temporary failure of the battery. Only when the failure disappears, and thus the battery voltage $V_{batt}$ value is again over the first threshold voltage $V1_{th}$, does the counter $cnt_1$ reach the counting value equal to 50 ms and generate the high logic value, which switches on the lamp 105 (see FIG. 4C).

With reference to the method 350, in step 301 (equal to step 301 of the method 300), the mechanical change-over switch 104 takes position p1 wherein the lamp 105 is connected and generates the control signal $S101_{ctrl}$ having a low logic value which maintains open the switch 103 (FIG. 4A).

From step 301 it continues to step 302 and from step 302 it continues to steps 351 and 353. In step 351, the value of the voltage drop $V_{sw}$ across the switch 103 is verified to be greater than the first threshold voltage $V1_{th}$. In the negative case (that is, $V_{sw}<V1_{th}$), it continues to step 353, while in the positive case (that is, $V_{sw}>V1_{th}$) it continues to step 352. In step 352 the value of the counter $cnt_2$ is reset.

From step 352 it continues to step 354 wherein it is verified if the value of counter $cnt_2$ is equal to $T_{A2}$. If the answer is negative (that is, $cnt_2<T_{A2}$) it continues to step 356, while in the positive case (that is $cnt_2=T_{A2}$) it continues to step 351.

In step 356 the value of counter cnt2 is incremented and then it returns to step 354. In step 353 the value of counter $cnt_1$ is reset.

From step 353 it continues to step 355 wherein it is verified if the value of the counter $cnt_1$ is equal to $T_{A1}$. In the negative case (that is, $cnt_1<T_{A1}$), it continues to step 357, while in the positive case (that is, $cnt_1=T_{A1}$) it continues to step 304.

In step 357, the value of the counter $cnt_1$ is incremented and then it returns to step 355. Step 304 has already been described previously with reference to FIG. 5A, and thus the flow diagram of the method 350 continues as previously described with reference to the flow diagram of the method 300.

It is observed that steps 351, 352, 354, 356 are performed in parallel to the steps 353, 355, 357, that is, the value of the counter $cnt_1$ is increased in parallel to the value of the counter $cnt_2$. Moreover, counter $cnt_2$ resets the value of the counter $cnt_1$ when the counter $cnt_2$ has reached its counting value and in case the value of the voltage drop $V_{sw}$ is less than $V1_{th}$ (steps 351, 353).

In the example wherein the counting value of the counter $cnt_1$ is equal to 50 ms and the value of counter $cnt_2$ is equal to 20 ms, and assuming that the value of voltage drop $V_{sw}$ is greater than $V1_{th}$, steps 351, 352, 354, 356 are performed to perform two cycles, each of 20 ms, and thus to reach a time interval equal to 40 ms. Moreover, in the same time interval the counter $cnt_1$ has continuously incremented its value to reach the value 40 ms. Therefore, under this assumptions, in the subsequent 10 ms, the counter $cnt_1$ continues to increment its value, reaching the counting value equal to 50 ms. Differently, if at the end of the first cycle of 20 ms (or at the end of the second cycle of 20 ms) the value of the voltage drop $V_{sw}$ is less than $V1_{th}$, the counter $cnt_1$ is reset (step 353) and it does not reach the counting value of 50 ms.

Now, a first operation of the electronic system 101 will be described, also referring to FIGS. 3, 4A-4D, 5A and 6A-6B. The purpose of the first operation includes illustrating that the requirements of the maximum delay of first pulse and of the minimum length of the first pulse are fulfilled in the case wherein it is disconnected a blinker connected and turned off, and subsequently a blinker is connected (the same or another one) in a time interval less than the one for discharging the supply capacitor C101.

To explain the embodiments, the following assumptions are considered:

when the mechanical change-over switch 104 is in position p1 wherein the lamp 105 of the left blinker is connected or in the position p3, wherein the lamp 106 of the right blinker is connected, the control signal $S101_{ctrl}$ is periodic with period T=704 ms (thus it has a frequency f=1.42 Hz) and a duty-cycle of 50%, that is the high length of the pulses is equal to 352 ms and thus the low length of the pulses is also equal to 352 ms;

the maximum delay $T_{max}$ of the first pulse of the control signal $S101_{ctrl}$ is equal to 100 ms;

the minimum length $T_{min}$ of the first pulse of the control signal $S101_{ctrl}$ is equal to 200 ms;

the change-over switch 104 is mounted on the handlebars of a motorbike and thus the driver is a biker;

switch 103 is implemented with an n-channel MOS transistor M0, thus the second control input terminal $t101_{ctrl}$ is the gate terminal, the first input terminal $t101_{in}$ is the drain terminal, the output terminal $t101_{out}$ is the source terminal, and the current $I_{LD}$ is the current flowing through the source terminal;

the value of the battery voltage $V_{batt}$ is equal to 12 V;

the relative voltage value of the first divided voltage threshold $V1_{th\_dv}$ (that is the voltage value referred to the virtual ground formed by the output terminal $t101_{out}$) is equal to 1.2 V;

the value of the threshold current $I_{th}$ is equal to 200 mA, which corresponds to a value of the second threshold voltage $V2_{th}$ having a relative voltage value equal to 50 mV; and the high voltage value of the internal control signal $S_T$ is equal to 3.3 V.

At the starting instant $t_0$ the biker switches on the motorbike and it starts travelling. The internal control signal $S_T$ is reset at a null value and the control signal $S101_{ctrl}$ is reset to a low logic value L.

At instants between $t_0$ and $t_1$ (excluded), the biker is travelling along a straight road and the blinkers are turned off. In particular, the change-over switch 104 is in the position p2, wherein the input terminal is connected to its output terminal connected to the high impedance reference $Z_\infty$.

At instant $t_1$ (subsequent to instant $t_0$) the biker is in the proximity of a left turn, and thus he actuates the left blinker for signaling the change of travelling direction to the adjacent vehicles. In particular, the biker drives the change-over switch 104 in the position p1 (step 301 of method 300), wherein the electrical connection of its input terminal to its output terminal connected to lamp 105 occurs (see FIG. 4A) and thus the connection of the source terminal $t101_{out}$ of the transistor MOS M0 to the lamp 105 is performed (See FIG. 4A).

The voltage of the source terminal $t101_{out}$ of the transistor M0 has a value which is equal to about 0 V. In fact, the resistance seen from the source terminal $t101_{out}$ towards the change-over switch 104 is in the order of 100 milli-Ohms and is indicated by $R_{10}$, while the resistance seen from the source terminal $t101_{out}$ towards the electronic device 102 (which is in turn connected to the battery voltage $V_{batt}$) is somewhat high and is indicated by $R_{1000}$. The voltage of the source terminal $t101_{out}$ is calculated from the battery voltage $V_{batt}$=12 V by a voltage divider according to the following formula: $V(t101_{out})=V_{batt}*R_{10}/(R_{1000}+R_{10})$. Since $R_{1000}$ is somewhat high, it results that $R_{10}/(R_{1000}+R_{10})$ is approximately equal to zero and thus $V(t101_{out})$ is approximately equal to 0 V. Consequently, also the monitoring voltage $S_{mnt}$ at the second input terminal of the low voltage detecting circuit 120 has a value which is approximately equal to 0 V.

The low voltage detecting circuit 120 receives, at its input terminal, the battery voltage $V_{batt}$ equal to 12 V, and receives at the second input terminal the monitoring voltage $S_{mnt}$ approximately equal to 0 V, and thus the divided relative voltage $S_{dv}=(V_{batt}-S_{mnt})*R_2/(R_1+R_2)$ is approximately equal to $12*R_2/(R_1+R_2)$. The first voltage comparator 121 receives at its negative terminal the divided relative voltage $S_{dv}=12*R_2(R_1+R_2)$, receives at the positive terminal the first divided voltage threshold $V1_{th\_dv}$ having a relative voltage value equal to 1.2 V, detects that $S_{dv}>V1_{th\_dv}$, and generates the low voltage signal $S_{fs1}$ having a low logic value L indicating that a lamp has not been disconnected. Since $V_{sw}=S_{dv}*(R_1+R_2)/R_2=12$ V, it is observed that the condition $S_{dv}>V1_{th\_dv}$ is equivalent to the condition $V_{sw}$ (=12 V)$>V1_{th}$ (=9 V).

The logic circuit 132 receives the low voltage signal $S_{fs1}$ having the low logic value L, resets the value of the counter $cnt_1$ to zero, and generates the delay signal $S_{rt}$ having a low logic value for indicating that the counter $cnt_1$ has not yet reached its counting value $T_{A1}$=50 ms. The generating circuit 131 receives the delay signal $S_{rt}$ having the low logic value, detects that the previous value (at instant $t_0$) of the internal control signal $S_T$ is null, and generates the internal control signal $S_T$ having a voltage value equal to zero.

The driving circuit 130 receives the periodic internal control signal $S_T$ having the voltage value equal to zero and generates the control signal $S101_{ctrl}$ having a low logic value L which maintains the transistor M0 open (see FIG. 4A) and thus the value of current $I_{LD}$ flowing through the source terminal $t101_{out}$ is zero; consequently, lamp 105 is turned off and is substantially equivalent to a short circuit. At instant $t_1$, the supply capacitor C101 has one terminal connected to the charging circuit 140 and the other terminal connected to ground (See FIG. 4A). Thus it starts to charge to the value of the battery voltage $V_{batt}$=12 V.

At instants between $t_1$ and $t_2$ ($t_2$ excluded), the counter $cnt_1$ is incremented (step 303) toward the value $T_{A1}$=50 ms, and the logic circuit 132 continues to generate the delay signal $S_{rt}$ having a low logic value indicating that the counter $cnt_1$ has not yet reached its counting value $T_{A1}$. Consequently, at instants between $t_1$ and $t_2$, the operation is analogous to the one described at instant $t_1$. At instant $t_2$ (subsequent to instant $t_1$ of the time interval $T_{A1}$=50 ms) the counter $cnt_1$ reaches its counting value $T_{A1}$=50 ms.

The logic circuit 132 detects that the counter $cnt_1$ has reached its counting value $T_{A1}$=50 ms and generates the delay signal $S_{rt}$ having a high logic value for indicating that the counter $cnt_1$ has reached its counting value $T_{A1}$. Moreover, at instant $t_2$, the value of the internal counter CNT is reset (step 304).

The generating circuit 131 receives the delay signal $S_{rt}$ having the high logic value, detects that the previous value (at instant $t_1$) of the internal control signal $S_T$ is zero, and generates the internal control signal $S_T$ equal to 3.3 V. The driving circuit 130 receives the periodic internal control signal $S_T$=3.3 V and generates the control signal $S101_{ctrl}$ having a high logic value H which closes the MOS transistor M0 (step 304). Consequently, the lamp 105 turns on. Since the MOS transistor M0 is closed, the resistance $R_{ds}$ between drain and source $t101_{out}$ of the MOS transistor M0 is relatively very low. For example, it is assumed that it is equal to $R_{ds}$=50 mΩ. Moreover, it is assumed that the lamp 105 connected to the ground reference is equivalent to a resistor having a resistance value $R_{105}$ of 10Ω. Under these assumptions, the value of the current $I_{LD}$ flowing through the source terminal $t101_{out}$ is equal to $I_{LD}=V_{batt}/(R_{105}+R_{ds})=12/(10+0.05)$, which is equal approximately to 1.2 A (See FIG. 4C). The voltage drop $V_{sw}$ between drain and source of the transistor M0 (that is, $V_{sw}=V_{batt}-V(t101_{out})$ is equal to $R_{ds}*I_{LD}$=0.05*1.2, which is equal approximately to 60 mV. Consequently, the voltage value of the source terminal $t101_{out}$ of the transistor M0 is equal to (12 V−60 mV), and also the value of the monitoring voltage $S_{mnt}$ is equal to (12 V−60 mV).

The low current detecting circuit 110 receives, at its input terminal, the battery voltage $V_{batt}$ equal to 12 V, and receives at the second input terminal the monitoring voltage $S_{mnt}$ equal to (12 V−60 mV). The set of the MOS transistor M0 and of the MOS transistor M1 implements a current mirror, wherein the current flowing through the MOS transistor M0 is mirrored by a factor 1/K on the MOS transistor M1. Since the transistor M0 is closed, the current $I_{LD}$ flowing through the source terminal $t101_{out}$ of the transistor M0 is equal to 1.2 A and thus the current flowing through the source terminal $t101_{out}$ of the transistor M1 is equal to (1.2/K) A. The absolute value of the internal monitoring voltage $S_{sn}$ is equal to the sum of the voltage drop across the monitoring resistor $R_{sn}$ and of the monitoring voltage $S_{mnt}$, thus $S_{sn}=R_{sn}*(1.2/K)+(12$ V−60 mV).

The second voltage comparator 111 receives, at the negative terminal, the internal monitoring voltage $S_{sn}=R_{sn}*(1.2/K)+(12$ V−60 mV), receives at the positive terminal the second threshold voltage $V2_{th}$ having a absolute voltage value equal to $S_{mnt}$+50 mV=(12 V−60 mV)+50 mV=12 V−10 mV (that is about 12 V), detects that $S_{sn}>V2_{th}$, and generates the low current signal $S_{fs2}$ having a low logic value L (step 305) indicating that any disconnection of the lamp 105 has not occurred. It is observed that the condition $S_{sn}>V2_{th}$ is equivalent to the condition $I_{LD}>I_{th}$ (that is, the current $I_{LD}$ flowing through the input terminal of the mechanical change-over switch 104 is greater than the value of the threshold current $I_{th}$) and thus, is equivalent, in the method 300, to the transition from the step 305 to the step 309. It is observed that the lamp 105 remains turned off for a time interval (between $t_1$ and $t_2$) equal to 50 ms, and thus the requirement of the maximum delay $T_{max}$ of the first pulse (less than 100 ms) is fulfilled.

At instant $t_2$ the supply capacitor C101 has one terminal connected to the charging circuit 140 and the other terminal connected to a terminal of the turned on lamp 105 (which is equivalent to a resistor of value 10Ω), wherein the lamp 105 has the other terminal connected to the ground reference voltage (See FIG. 4C). Therefore, starting from instant $t_2$, the supply capacitor C101 supplies the electronic device 102 and it starts discharging.

At instants $t_3$, $t_3'$, $t_3''$ . . . (subsequent to instant $t_2$), the operation is analogous to the one described at instant $t_2$, with the difference being that the value of the internal counter CNT (step 305, transition from step 305 to 309, then the loop formed by steps 309, 310, 305) is incremented. Therefore the driving circuit 130 continues to generate the control signal $S101_{ctrl}$ having the high logic value H maintaining closed the transistor M0 and maintaining turned on the lamp 105. The low current detecting circuit 110 continues to generate the low current signal $S_{fs2}$ having the low logic value (steps from 305 to 309). The logic circuit 132 receives the low current signal $S_{fs2}$ having a low logic value, increments the value of the internal counter CNT toward the value T/2, and generates the end counting signal $S_{fc}$ having a low logic value for indicating that the internal counter CNT has not reached value T/2.

Moreover at instants $t_3$, $t_3'$, $t_3''$ . . . the supply capacitor C101 continues discharging and the value of its capacity is selected to discharge without reaching a zero value. At instant $t_4$ (subsequent to instants $t_3$, $t_3'$, $t_3''$ . . . ) the internal counter CNT has reached the value T/2=352 ms (transition from step 310 to 311).

The logic circuit 132 detects that the internal counter CNT has reached the value T/2=352 ms and generates the end counting signal $S_{fc}$ having a high logic value for indicating that the internal counter CNT has reached the value T/2. The generating circuit 131 receives the end counting signal $S_{fc}$ having the high logic value, detects that the previous value (instant $t_3$) of the internal control signal $S_T$ is equal to 3.3 V, and generates the internal control signal $S_T$ having a zero voltage value.

The driving circuit 130 receives the internal control signal $S_T$=0V and generates the control signal $S101_{ctrl}$ having a low logic value L, which opens the transistor M0 (step 311). Moreover, at instant $t_4$, the internal counter CNT is reset (step 311).

Therefore, at instant $t_4$ the electronic system 101 is again in the state shown in FIG. 4A, and the lamp 105 is turned off. Moreover, the value of monitoring voltage $S_{mnt}$ is equal to zero.

The low voltage detecting circuit 120 has an operation analogous to instant $t_1$, and thus it generates the low voltage signal $S_{fs1}$ having a low logic value L indicating that it has not occurred any disconnection of a lamp.

It is observed that the lamp 105 remains turned on from instant $t_2$ until instant $t_4$ wherein the internal counter CNT reaches value T/2=352 ms. Thus it remains turned on for a time interval equal to 352 ms. Therefore the requirement of the minimum length $T_{min}$ of the first pulse (greater than or equal to 200 ms) is also fulfilled.

At instant $t_4$ the supply capacitor C101 has one terminal connected to the charging circuit 140 and the other terminal connected to ground, thus it starts again charging towards the battery voltage value $V_{batt}$=12 V.

At instants $t_4'$, $t_4''$ ... (subsequent to instant $t_4$) the driving circuit 130 continues to generate the control signal $S101_{ctrl}$ having the low logic value L, which maintains the MOS transistor M0 open and maintains the lamp 105 turned off. The low voltage detecting circuit 120 continues to generate the low voltage signal $S_{fs1}$ having the low logic value. The logic circuit 132 receives the low voltage signal $S_{fs1}$ having the low logic value, increments the value of the internal counter CNT (step 313, then loop formed by steps 312, 313, 314), and generates the end counting signal $S_{fc}$ having a low logic value for indicating that the internal counter CNT has not reached the value T/2. Moreover, at instants $t_4'$, $t_4''$ ... the supply capacitor C101 continues charging, until it reaches the battery voltage value $V_{batt}$=12 V.

At instant $t_5$ (subsequent to instant $t_4$), the biker has already turned left, and thus he deactivates the left blinker and disconnects the lamp 105. That is, he drives the change-over switch 104 to the position p2 wherein the electrical connection of its input terminal to its output terminal connected to the high impedance reference $Z_\infty$ occurs. Therefore the electronic circuit 101 is in the state shown in FIG. 4B.

At instant $t_5$, the supply capacitor C101 has one terminal connected to the charging circuit 140 and the other terminal connected to the high impedance reference $Z_\infty$, thus the supply capacitor C101 starts discharging. It is assumed the time interval between $t_4$ and $t_5$ is equal to 200 ms, that is, less than half of period T/2=352 ms. Thus the counter CNT does not reach the value T/2=352 ms. Therefore the biker deactivates the left blinker at instant $t_5$, wherein the left blinker lamp 105 is turned off since the control signal $S101_{ctrl}$ has the low logic value.

The voltage of the source terminal $t101_{out}$ of the transistor M0 has a value slightly less than 12 V. In fact, the resistance seen from the source terminal $t101_{out}$ towards the change-over switch 104 is relatively very high (and it is indicated with $R_\infty$), while the resistance seen from the source terminal $t101_{out}$ toward the electronic device 102 (in turn connected to the battery voltage $V_{batt}$) is relatively very low (and it is indicated with $R_0$). The voltage of the source terminal $t101_{out}$ is calculated from the battery voltage $V_{batt}$=12 V by a voltage divider according to the following formula: $V(t101_{out})=V_{batt}*R_\infty/(R_0+R_\infty)$. Since $(R_0+R_\infty)$ is slightly greater than $R_\infty$, it results that $V(t101_{out})$ is slightly less than $V_{batt}$, that is slightly less than 12 V.

Consequently, the monitoring voltage $S_{mnt}$ at the second input terminal of the low voltage detecting circuit 120 also has a value slightly less than 12 V. Thus, the voltage difference $V_{sw}$ between the drain (12 V) and the source (slightly less than 12 V) of the transistor M0 is slightly greater than 0 (transition from step 312 to 306).

The low voltage detecting circuit 120 receives, at its first input terminal, the battery voltage $V_{batt}$ equal to 12 V, and receives, at its second input terminal, the monitoring voltage $S_{mnt}$ having a value slightly less than 12 V. Consequently, the value of the divided voltage $S_{vd}=(V_{batt}-S_{mnt})*R_2/(R_1+R_2)$ is about equal to 0. The first voltage comparator 121 receives, at the negative terminal, the divided relative voltage $S_{dv}$ equal approximately to 0, receives, at the positive terminal, the first divided voltage threshold $V1_{th\_dv}$ having a relative voltage value equal to 1.2 V, detects that $V1_{th\_dv}>S_{dv}$, and generates the low voltage signal $S_{fs1}$ having the high logic value H indicating that a disconnection of the lamp 105 occurred at an instant wherein it was turned off. Since $V_{sw}=S_{dv}*(R_1+R_2)/R_2$, it is observed that the condition $V1_{th\_dv}>S_{dv}$ is equivalent to the condition $V1_{th}>V_{sw}$, and thus, in the method 300, is equivalent to the transition from the step 312 to the step 306 and then to 307.

The logic circuit 132 receives the low voltage signal $S_{fs1}$ having the high logic value H, resets the value of the internal counter CNT (step 307), and generates the end counting signal $S_{fc}$ having the low logic value. The generating circuit 131 receives the end counting signal $S_{fc}$ having the low logic value, detects that the previous value (at instant $t_4$) of the internal control signal $S_T$ is zero, and generates the internal control signal $S_T$ having a zero voltage value.

The driving circuit 130 receives the internal control signal $S_T$=0 V and generates the control signal $S101_{ctrl}$ having a low logic value L (steps 312, 306, 307) maintaining the transistor M0 open. Therefore the electronic system 101 is in the stand-by state shown in FIG. 4B.

It is observed that the internal counter CNT is reset and the control signal $S101_{ctrl}$ has the low logic value L (step 307). This allows the electronic system 101 to be placed in the stand-by state (that is, it is waiting that the biker activates again a blinker), and allows the requirements of the maximum delay of the first pulse and of the minimum length of the first pulse to be fulfilled in case of a subsequent activation (at instant $t_6$) of a blinker (the same or another) within a time interval less than the time for discharging the supply capacitor C101.

At instants $t_5'$, $t_5''$ ... between instants $t_5$ and $t_6$ ($t_6$ excluded), the operation is analogous to the one at instant $t_5$. Thus the driving circuit 130 continues to generate the control signal $S101_{ctrl}$ having the low logic value L maintaining the transistor M0 open, the lamp 105 remains turned off, and the logic circuit 132 maintains the internal counter CNT at the value 0 (the loop formed by steps 306, 307, 308). Moreover, the supply capacitor C101 continues discharging, however without reaching the zero value.

At instant $t_6$ (subsequent to instant $t_5$) the biker is in proximity of a further left turn, and thus, he activates again the left blinker to turn on the lamp 105 for indicating the change of direction to the adjacent vehicles. It is assumed that the time interval between instant $t_5$ and $t_6$ is equal to 250 ms, that is, less than 1 s, or less than the time for the supply capacitor C101 to discharge.

Operation at instants $t_6$, $t_7$ and $t_8$ is analogous to the operation described at instants $t_1$, $t_2$ and $t_4$ respectively (transition from step 308 to 302, then steps 303, 304). Thus, at instant $t_6$, the electronic system 101 is again in the state shown in FIG. 4A wherein the voltage drop $V_{sw}$ between drain and source of the transistor M0 is equal to 12 V and thus is greater than the first divided voltage threshold $V1_{th\_dv}$=1.2 V (transition from step 308 to 302). Therefore the driving circuit 130 generates at instant $t_6$ the control signal $S101_{ctrl}$ having a low logic value L maintaining the transistor M0 open for a time interval $T_{A1}$=50 ms between $t_6$ and $t_7$ (step 303), and at instant $t_7$ it generates the control signal $S101_{ctrl}$ having the high logic value H which closes the transistor M0 and the internal counter CNT is reset (step 304). Thus, (instants between $t_7$ and $t_8$) the internal counter CNT is incremented (step 309) until it reaches the value T/2=352 ms at instant $t_8$.

It is observed that the biker deactivates a blinker (at instant $t_5$) and activates again a blinker (at instant $t_6$) after a time interval which is very short, in particular in a time interval (250 ms) less than the time (1 s, for example) for the supply capacitor C101 to discharge. Despite that, the electronic device 102 allows the control signal $S101_{ctrl}$ to be generated to fulfill the requirements of the maximum delay of the first pulse and of the minimum length of the first pulse.

A second operation of electronic system 101 will now be described also referring to FIGS. 3, 4A-4D, 5A and 7A-7B.

The purpose of the second operation includes illustrating that the requirements of the maximum delay of first pulse and of the minimum length of the first pulse are fulfilled in the case wherein a blinker connected and turned on is deactivated, and afterwards a blinker (the same or another) is connected in a time interval less than the one for discharging the supply capacitor C101. The same assumptions made with reference to the first operation are made.

Operation between the instants $t_0$ and $t_4"$ shown in FIG. 7A is equal to the one previously described between instants $t_0$ and $t_4"$ shown in FIG. 6A, while it is different for instants subsequent to $t_4"$. In particular, at instant $t_{105}$ (see FIG. 7A) the value of the internal counter CNT reaches the value T/2=352 ms (transition from step 314 to step 304).

The logic circuit 132 detects that the internal counter CNT has reached the value T/2=352 ms and generates the end counting signal $S_{fc}$ having a high logic value indicating that the internal counter CNT has reached the value T/2. The generating circuit 131 receives the end counting signal $S_{fc}$ having the high logic value, detects the previous value (at instant $t_4$) of the internal control signal $S_T$ is zero, and generates the internal control signal $S_T$ equal to 3.3 V.

The driving circuit 130 receives the internal control signal $S_T$=3.3 V and generates the control signal $S101_{ctrl}$ having a high logic value H which closes the transistor M0 (step 304). Consequently, the lamp 105 turns on. Moreover, at instant $t_{105}$ the internal counter CNT is reset (step 304).

Therefore at instant $t_{105}$ the electronic system 101 is again in the state shown in FIG. 4C. Moreover, the value of monitoring voltage $S_{mnt}$ is equal to (12 V−60 mV), as previously explained at instant $t_2$ of the first operation.

The low current detecting circuit 110 generates the low current signal $S_{fs2}$ having a low logic value L (step 305) indicating that the lamp 105 has not been disconnected, as previously explained at instant $t_2$ of the first operation. At instant $t_{105}$ the supply capacitor C101 has one terminal connected to the charging circuit 140 and the other terminal connected to a terminal of the lamp 105 (which in turn has the other terminal connected to the ground reference). Thus the supply capacitor C101 supplies the electronic device 102, and it starts discharging again.

At instants between $t_{105}$ and $t_{106}$ (excluded), the driving circuit 130 continues to generate the control signal $S101_{ctrl}$ having the high logic value H maintaining the MOS transistor M0 closed. The value of the internal counter CNT continues to be incremented (step 309, then the loop formed by steps 310, 305, 309), and the lamp 105 remains turned on. Moreover, the supply capacitor C101 continues to supply the electronic device 102, and thus it continues discharging without reaching the zero value.

At instant $t_{106}$ (subsequent to instant $t_{105}$), the biker has already turned left, and thus he deactivates the left blinker and disconnects lamp 105. That is, it drives the change-over switch 104 in the position p2 wherein its input terminal is electrically connected to its output terminal connected to its high impedance reference $Z_\infty$, and the lamp 105 turns off.

Therefore the electronic system 101 is in the state shown in FIG. 4A. At instant $t_{106}$ the supply capacitor C101 has one terminal connected to the charging circuit 140 and the other terminal connected to high impedance reference $Z_\infty$, thus the supply capacitor C101 continues discharging, however without reaching the zero value.

It is assumed that the time interval between instants $t_{105}$ and $t_{106}$ is equal to 200 ms, that is, less than half of the period T/2=352 ms. Thus, the counter CNT does not reach the value T/2=352 ms. Therefore the biker deactivates the left blinker at instant $t_{106}$, wherein the lamp 105 of the left blinker is turned on, because the control signal $S101_{ctrl}$ has the high logic value.

Voltage at the source terminal $t101_{out}$ of the transistor M0 has a value equal to 12 V. Consequently, the monitoring voltage $S_{mnt}$ at the second input terminal of the low voltage detecting circuit 120 also has a value equal to 12 V.

The low current detecting circuit 110 receives, at its input terminal, the battery voltage $V_{batt}$ equal to 12 V, and receives, at its second input terminal, the monitoring voltage $S_{mnt}$ equal to 12 V. Since the source terminal $t101_{out}$ of the transistor M0 is connected to the high impedance reference $Z_\infty$, the current $I_{LD}$ flowing through the source terminal $t101_{out}$ of the transistor M0 is zero, and thus, also the current flowing through the source terminal of the transistor M1 (current mirror) is zero. Consequently, the voltage drop across the monitoring resistor $R_{sn}$ is equal to 0 V. The absolute value of the internal monitoring voltage $S_{sn}$ is equal to the sum of the voltage drop across the monitoring resistor $R_{sn}$ (0 V) and of the monitoring voltage $S_{mnt}$ (slightly less than 12 V). Thus, the absolute voltage value of the internal monitoring voltage $S_{sn}$ is also equal to 12 V.

The second voltage comparator 111 receives, at its negative terminal, the monitoring voltage $S_{mnt}$ having an absolute voltage value equal to 12 V, receives, at the positive terminal, the second threshold voltage $V2_{th}$ having an absolute voltage value equal to $S_{mnt}$+50 mV=12 V+50 mV, detects that $S_{sn}<V2_{th}$, and generates the low current signal $S_{fs2}$ having a high logic value indicating that a disconnection of the lamp 105 has occurred at an instant where it was turned on. It is observed that the condition $S_{sn}<V2_{th}$ is equivalent to the condition $I_{LD}<I_{th}$, and thus, is equivalent, in method 300, to the transition from step 305 to step 306 and then to 307. The logic circuit 132 receives the low current signal $S_{fs2}$ having the high logic value H, resets the value of the internal counter CNT (step 307), and generates the end counting signal $S_{fc}$ having the low logic value.

The generating circuit 131 receives the end counting signal $S_{fc}$ having the low logic value, detects that the previous value (at instant $t_{105}$) of the internal control signal $S_T$ is high, and generates the internal control signal $S_T$ having a zero voltage value. The driving circuit 130 receives the internal control signal $S_T$=0 V and generates the control signal $S101_{ctrl}$ having a low logic value L (steps 312, 306, 307), which opens the transistor M0. Therefore, the electronic system 101 has a transition to the state shown in FIG. 4B, and the lamp 105 remains turned off.

It is observed that the internal counter CNT is reset, and the control signal $S101_{ctrl}$ takes a low logic value L (step 307). This allows the electronic system 101 to be placed in the stand-by state shown in FIG. 4B (that is, it is waiting for the biker to activate again a blinker) and allows the fulfillment of the requirements of maximum delay of the first pulse and of the minimum length of the first pulse in case of a subsequent connection (at instant $t_{107}$) of a blinker (the same or another) within a time interval less than the time for discharging the supply capacitor C101.

Moreover, it is observed that when the disconnection of the lamp 105 occurs when it is turned off, the electronic system 101 is carried into the stand-by state shown in FIG. 4B, which is the same as where the occurrence of the electronic system 101 disconnects the lamp 105 when it is turned off (see instant $t_5$ of the description of first operation). At instants $t_{106}'$, $t_{106}''$ ... between $t_{106}$ and $t_{107}$ ($t_{107}$ excluded), the operation is analogous to the one at instant $t_{106}$, thus the driving circuit 130 continues to generate the control signal $S101_{ctrl}$ having the low logic value L, which maintains the transistor M0 open. The lamp 105 remains turned off and the logic circuit 132 maintains the internal counter CNT at value 0 (loop formed by steps 306, 307, 308). Moreover, the supply capacitor C101 continues discharging however without reaching the zero value.

At instant $t_{107}$ (subsequent to instants $t_{106}'$, $t_{106}''$), the biker is in the proximity of a further left turn, and thus again activates the left blinker for turning on lamp 105 for signaling the change of direction to adjacent vehicles. It is assumed that the time interval between instants $t_{106}$ and $t_{107}$ is equal to 500 ms, that is, less than 1 s or less than the time for the supply capacitor C101 to discharge.

The operation at instants $t_{107}$, $t_{108}$, $t_{109}$ is analogous to the one described with reference to instants $t_1$, $t_2$, $t_4$ of the first operation (transition from step 308 to 302, then to steps 303, 304). In particular, at instant $t_{107}$, the electronic system 101 is again in the state shown in FIG. 4A, wherein the voltage drop $V_{sw}$ between the drain and the source of the transistor M0 is equal to 12 V, and thus it is greater than $V1_{th}$ (transition from step 308 to 302 and then to 303). Therefore the driving circuit 130 generates first, at instant $t_{107}$, the control signal $S101_{ctrl}$ having a low logic value L maintaining the transistor M0 open for a time interval $T_{A1}$=50 ms between $t_{106}$ and $t_{107}$ (step 303), then at instant $t_{108}$ it generates the control signal $S101_{ctrl}$ having the high logic value H, which closes the transistor M0 and the internal counter CNT is reset (step 304), and then (instants between $t_{108}$ and $t_{109}$), the internal counter CNT is incremented (step 309) until it reaches the value T/2=352 ms at instant $t_{109}$.

It is observed that the biker deactivates a blinker (at instant $t_{106}$) and connects again a blinker (at instant $t_{107}$) after a time interval which is very short, in particular, in a time interval (500 ms) less than the time (1 s, for example) for the supply capacitor C101 to discharge. Despite that, the electronic device 102 generates the control signal $S101_{ctrl}$ to fulfill the requirements of the maximum delay of the first pulse and minimum length of the first pulse.

A method aspect includes driving the lamps of the blinkers of a vehicle by a switch. The method includes disconnecting a lamp, detecting that the voltage drop between the first input terminal and the output terminal of the switch is less than a first voltage value and opening the switch, and reconnecting the same or another lamp. The method also includes detecting that the voltage drop between the first input terminal and the output terminal of the switch is greater than or equal to the first voltage value, and maintaining the switch open for a time interval less than a maximum time interval. The method further includes maintaining the switch closed for a time interval greater than or equal to a minimum time interval.

Driving the lamps may further detecting that the current flowing through the switch is less than a current value and opening the switch. Driving the lamps may further include, between reconnecting the lamp, and detecting the voltage drop between first input terminal the output terminal of the switch being greater than or equal to a first voltage value, detecting that the voltage drop between the first input terminal and the output terminal of the switch is less than the first voltage value, resetting the value of a first counter and incrementing its value toward a counting value, resetting the value of a second counter and incrementing its value to reach a counting value less than the counting value of the first counter, and detecting that the voltage drop between the first input terminal and the output terminal of the switch is less than the first voltage value and resetting the value of the first counter. The value of the second counter may be reset and its value incremented until it reaches its counting value. Also, the method may include, between reconnecting the lamp, and detecting the voltage drop between first input terminal the output terminal of the switch being greater than or equal to a first voltage value, detecting that the voltage drop between the first input terminal and the output terminal of the switch is greater than or equal to the first voltage value, resetting the value of the second counter and incrementing its value, and incrementing the value of the first counter until to reach its counting value and closing the switch.

In some embodiments, the electronic device 102 and switch 103 can be implemented with a single integrated circuit or with two integrated circuits connected to each other by wires bonding, for example.

That which is claimed is:

1. An electronic system for driving a lamp of a blinker of a vehicle, the lamp having a terminal to be electrically coupled to a reference voltage, the electronic system comprising:
   a switch having a first input terminal configured to receive a battery voltage, a second input control terminal configured to receive a control signal for opening and closing the switch, and an output terminal;
   a change-over switch configured to couple, alternatively, the output terminal to the lamp and to an impedance reference; and
   an electronic device coupled to said switch and configured to
      detect whether a voltage drop between the first input terminal and the output terminal is less than a first voltage value, and, based thereon, generate the control signal to have a first value to maintain said switch open, and
      detect whether the voltage drop between the first input terminal and the output terminal is greater than or equal to the first voltage value, and, based thereon, generate the control signal to have the first value to maintain the switch open for a time interval less than a first threshold time interval, and generate the control signal to have the second value to maintain said switch closed for a time interval greater than or equal to a second threshold time interval, the second threshold time interval being less than the first threshold time interval.

2. The electronic system according to claim 1, wherein said electronic device is configured to detect whether a current flowing through said switch is less than a current value and to generate the control signal to have the first value for opening the switch.

3. The electronic system according to claim 1 wherein said electronic device comprises a low voltage detecting circuit comprising:
   a first input terminal coupled to the first input terminal of said switch and configured to receive the battery voltage;
   a second input terminal coupled to the output terminal of said switch and configured to receive receiving a monitoring voltage signal;
   a voltage divider coupled between the first input terminal and the second input terminal and configured to generate a divided voltage signal based upon the battery voltage and the monitoring voltage signal; and a first voltage comparator configured to receive the divided voltage signal and a divided voltage value, and based thereon, generate a low voltage signal having a value indicating a disconnection of the lamp when the lamp is turned off, the divided voltage value being a partition of the first voltage value;

wherein said electronic device is configured to detect the low voltage signal and generate, based thereon, the control signal having the first value for maintaining said switch open.

4. The electronic system according to claim 3, wherein said electronic device comprises a low current detecting circuit comprising:

a first input terminal coupled to the first input terminal of said switch and configured to receive the battery voltage;

a second input terminal coupled to the output terminal of said switch and configured to receive the monitoring voltage signal;

a third input terminal coupled to the second input control terminal of said switch and configured to receive the control signal;

a n-channel MOSFET transistor having a gate terminal coupled to the third input terminal and configured to receive control signal, having a drain terminal coupled to the first input terminal and configured to receive the battery voltage, and having a source terminal configured to provide an internal monitoring voltage signal;

a monitoring resistor having a first terminal coupled to the source terminal of said n-channel MOSFET transistor and configured to receive the internal monitoring voltage signal, and having a second terminal coupled to the second input terminal and configured to receive the monitoring voltage signal; and a second voltage comparator configured to receive the internal monitoring voltage signal and a second voltage value, and generate a low current signal having a value indicating a disconnection of the lamp when the lamp is turned on, the second voltage value being based upon a current value of current flowing through said switch;

wherein said electronic device is configured to detect the low current signal and generate, based thereon, the control signal having the first value for opening said switch.

5. The electronic system according to claim 4, wherein said electronic device comprises a counter configured to count to a value equal to half of a period, wherein said electronic device is configured to reset the value of said counter when a low voltage value having the value indicating the disconnection of the lamp when the lamp is turned off and when the low current signal has the value indicating the disconnection of the lamp when this is turned on.

6. The electronic system according to claim 1, further comprising:

a supply capacitor between said electronic device and the output terminal of said switch, and configured to supply the lamp when the lamp is connected and turned on; and a charging circuit configured to be supplied by the battery voltage and to charge said supply capacitor when the lamp is connected and turned off.

7. An integrated circuit for driving a lamp of a blinker of a vehicle, the lamp having a terminal to be electrically coupled to a reference voltage, the integrated circuit comprising:

at least one substrate;

a switch carried by said at least one substrate and having a first input terminal configured to receive a battery voltage, a second input control terminal configured to receive a control signal for opening and closing the switch, and an output terminal; and an electronic device carried by said at least one substrate and coupled to said switch and configured to detect whether a voltage drop between the first input terminal and the output terminal is less than a first voltage value, and, based thereon, generate the control signal to have a first value to maintain said switch open, and detect whether the voltage drop between the first input terminal and the output terminal is greater than or equal to the first voltage value, and, based thereon, generate the control signal to have the first value to maintain the switch open for a time interval less than a first threshold time interval, and generate the control signal to have the second value to maintain said switch closed for a time interval greater than or equal to a second threshold time interval, the second threshold time interval being less than the first threshold time interval.

8. The integrated circuit according to claim 7, wherein said electronic device is configured to detect whether a current flowing through said switch is less than a current value and to generate the control signal to have the first value for opening the switch.

9. The integrated circuit according to claim 7, wherein said electronic device comprises a low voltage detecting circuit comprising:

a first input terminal coupled to the first input terminal of said switch and configured to receive the battery voltage;

a second input terminal coupled to the output terminal of said switch and configured to receive receiving a monitoring voltage signal;

a voltage divider coupled between the first input terminal and the second input terminal and configured to generate a divided voltage signal based upon the battery voltage and the monitoring voltage signal; and a first voltage comparator configured to receive the divided voltage signal and a divided voltage value, and based thereon, generate a low voltage signal having a value indicating a disconnection of the lamp when the lamp is turned off, the divided voltage value being a partition of the first voltage value;

wherein said electronic device is configured to detect the low voltage signal and generate, based thereon, the control signal having the first value for maintaining said switch open.

10. The integrated circuit according to claim 9, wherein said electronic device comprises a low current detecting circuit comprising:

a first input terminal coupled to the first input terminal of said switch and configured to receive the battery voltage;

a second input terminal coupled to the output terminal of said switch and configured to receive the monitoring voltage signal;

a third input terminal coupled to the second input control terminal of said switch and configured to receive the control signal;

a n-channel MOSFET transistor having a gate terminal coupled to the third input terminal and configured to receive control signal, having a drain terminal coupled to the first input terminal and configured to receive the battery voltage, and having a source terminal configured to provide an internal monitoring voltage signal;

a monitoring resistor having a first terminal coupled to the source terminal of said n-channel MOSFET transistor and configured to receive the internal monitoring voltage signal, and having a second terminal coupled to the second input terminal and configured to receive the monitoring voltage signal; and a second voltage comparator configured to receive the internal monitoring voltage signal and a second voltage value, and generate a low current signal having a value indicating a disconnection of the lamp when the lamp is turned on, the second voltage value being based upon a current value of current flowing through said switch;

wherein said electronic device is configured to detect the low current signal and generate, based thereon, the control signal having the first value for opening said switch.

11. The integrated circuit according to claim 10, wherein said electronic device comprises a counter configured to count to a value equal to half of a period, wherein said electronic device is configured to reset the value of said counter when a low voltage value having the value indicating the disconnection of the lamp when the lamp is turned off and when the low current signal has the value indicating the disconnection of the lamp when this is turned on.

12. A method of driving a lamp of a blinker of a vehicle, the method comprising:

disconnecting, using a switch, the lamp;

detecting whether a voltage drop between a first input terminal and an output terminal of the switch is less than a first voltage value and opening the switch;

reconnecting, using the switch, at least one of the lamp and another lamp;

detecting whether the voltage drop between the first input terminal and the output terminal of the switch is greater than or equal to the first voltage value;

maintaining the switch open for a time interval less than a first threshold time interval; and maintaining the switch closed for a time interval greater than or equal to a second threshold time interval, the second threshold time interval being less than the first threshold time interval.

13. The method according to claim 12, wherein detecting whether the voltage drop between the first input terminal and the output terminal of the switch is less than the first voltage value and opening the switch further comprises detecting whether current flowing through the switch is less than a current value and opening the switch.

14. The method according to claim 12, further comprising, between reconnecting the at least one of the lamp and another lamp and detecting whether the voltage drop between the first input terminal and the output terminal of the switch is greater than or equal to the first voltage value:

detecting whether the voltage drop between the first input terminal and the output terminal of the switch is less than the first voltage value, resetting a value of a first counter, and incrementing the value of the first counter toward a first counting value;

resetting a value of a second counter and incrementing the value of the second counter to reach a second counting value less than the value of the first counting value;

detecting whether the voltage drop between the first input terminal and the output terminal is less than the first voltage value and resetting the value of the first counter;

resetting the value of the second counter and incrementing the value of the second counter until the second counting value is reached;

detecting whether the voltage drop between the first input terminal and the output terminal is greater than or equal to the first voltage value, resetting the value of the second counter and incrementing the value of the second counter; and incrementing the value of the first counter until the first counting value is reached and closing the switch.

* * * * *